(12) United States Patent
Takemoto et al.

(10) Patent No.: US 6,382,401 B2
(45) Date of Patent: May 7, 2002

(54) BOXING SYSTEM USING CONVEYOR APPARATUS

(75) Inventors: Fumihiko Takemoto; Osamu Okabe, both of Kobe (JP)

(73) Assignee: Yamato Scale Company, Limited (JP)

( * ) Notice: Subject to any disclaimer, the term of this patent is extended or adjusted under 35 U.S.C. 154(b) by 0 days.

(21) Appl. No.: 09/817,585

(22) Filed: Mar. 26, 2001

Related U.S. Application Data

(62) Division of application No. 09/338,936, filed on Jun. 23, 1999, now Pat. No. 6,260,689.

(30) Foreign Application Priority Data

| | | |
|---|---|---|
| Jun. 25, 1998 | (JP) | 10-179132 |
| Jul. 27, 1998 | (JP) | 10-211227 |
| Nov. 20, 1998 | (JP) | 10-331256 |

(51) Int. Cl.⁷ ............................ B65G 17/34
(52) U.S. Cl. ............... 198/803.11; 198/419.3; 198/867.1
(58) Field of Search ............ 198/803.1, 803.11, 198/803.13, 419.3, 484.1, 474.1, 867.1, 803.2, 867.08

(56) References Cited

U.S. PATENT DOCUMENTS

| | | | | |
|---|---|---|---|---|
| 2,601,376 A | * | 6/1952 | Eaton | 198/419.3 |
| 4,398,383 A | | 8/1983 | Prakken | |
| 4,716,714 A | | 1/1988 | Tisma | |
| 4,718,540 A | * | 1/1988 | Greenwell | 198/803.11 X |
| 4,768,642 A | | 9/1988 | Hunter | |
| 4,893,707 A | * | 1/1990 | Langen et al. | 198/803.11 X |
| 5,127,209 A | | 7/1992 | Hunter | |
| 5,339,606 A | | 8/1994 | Benz | |
| 5,560,473 A | * | 10/1996 | Ivancso, Jr. et al. | 198/803.11 |
| 5,586,642 A | * | 12/1996 | Hawkins | 198/803.11 |
| 5,718,323 A | * | 2/1998 | Flix | 198/474.1 X |
| 5,755,317 A | | 5/1998 | Holston | |
| 5,884,749 A | | 3/1999 | Goodman | |

FOREIGN PATENT DOCUMENTS

| | | |
|---|---|---|
| DE | 2 248 520 | 4/1974 |
| EP | 0 153 551 | 9/1985 |
| EP | 0 662 421 A1 | 7/1995 |
| EP | 0 695 703 A1 | 2/1996 |
| EP | 0 748 751 A1 | 12/1996 |
| GB | 911455 | 11/1962 |
| JP | 5-278840 | 10/1993 |
| JP | 9-77003 | 3/1997 |
| WO | 96/22223 | 7/1996 |

* cited by examiner

Primary Examiner—James R. Bidwell
(74) Attorney, Agent, or Firm—Senniger, Powers, Leavitt & Roedel

(57) ABSTRACT

A conveyor apparatus includes first and second groups of fins which are spaced along the conveying direction to provide spaces sufficient to hold packs therein. The fins in each group are divided into first and second sets. The first and second fin groups are mounted to first and second conveyor chain pairs, respectively, and moved through pack loading and unloading stations. Stepping motors drive the first and second chain pairs independently. A controller causes a fin set after being loaded or unloaded to be forwarded to the unloading or loading station at a speed higher than the speed at which the fin sets move through the loading station.

18 Claims, 30 Drawing Sheets

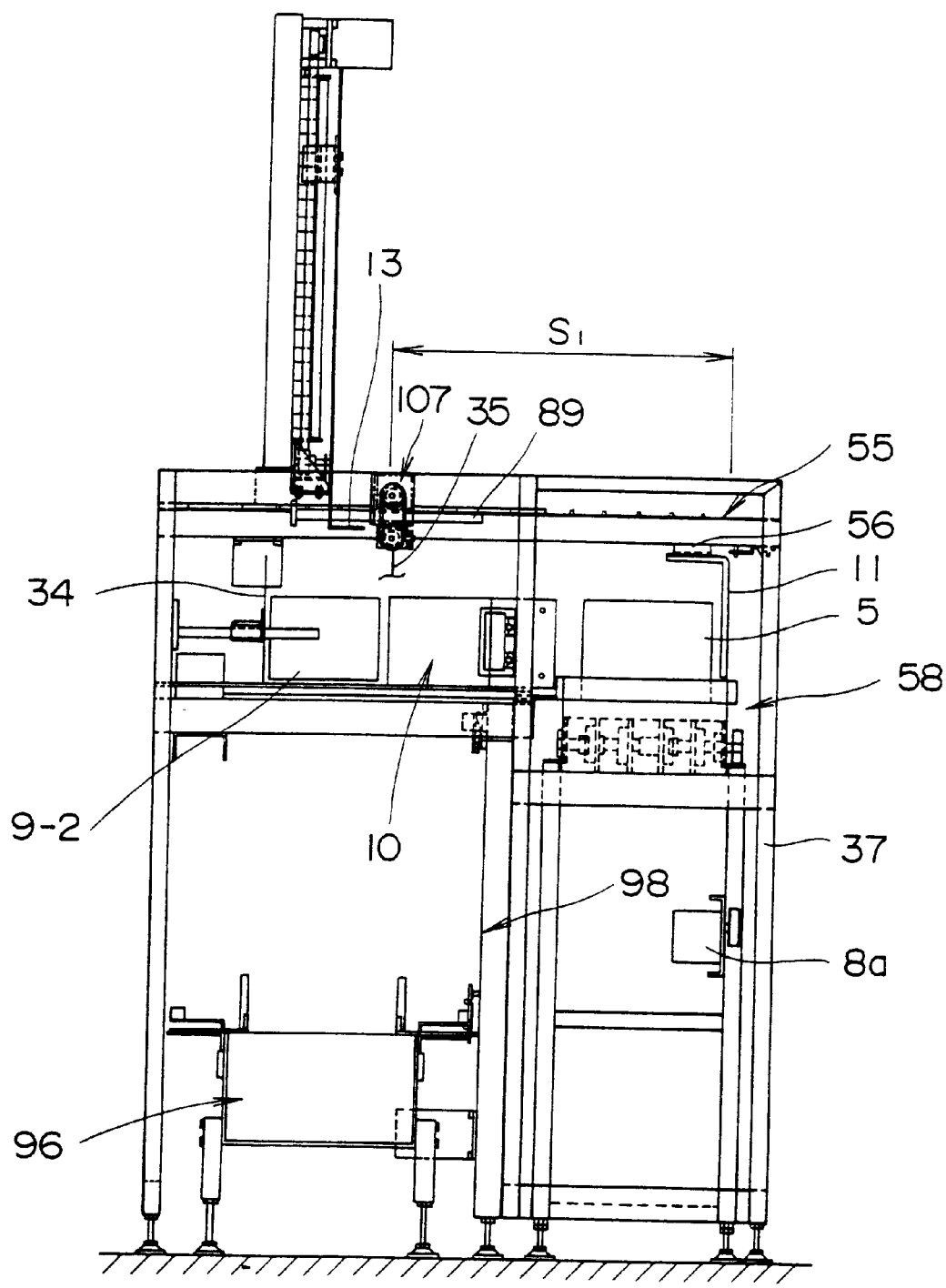
F I G . 5

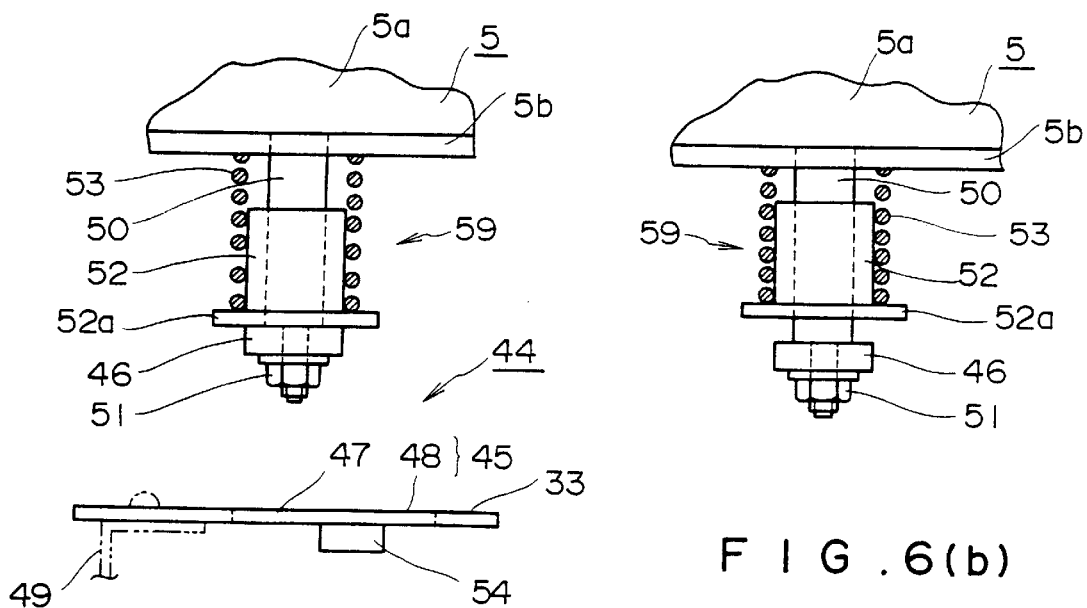
FIG. 6(a)
FIG. 6(b)
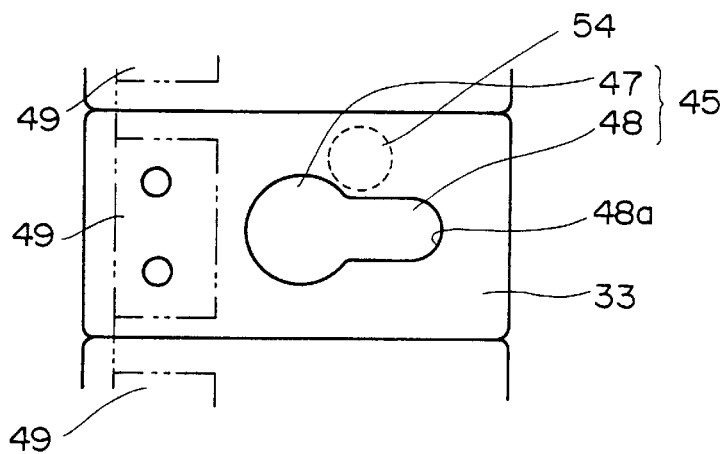
FIG. 6(c)

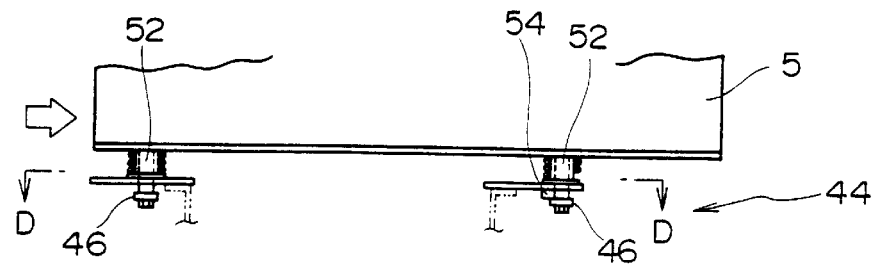
F I G. 7(c)
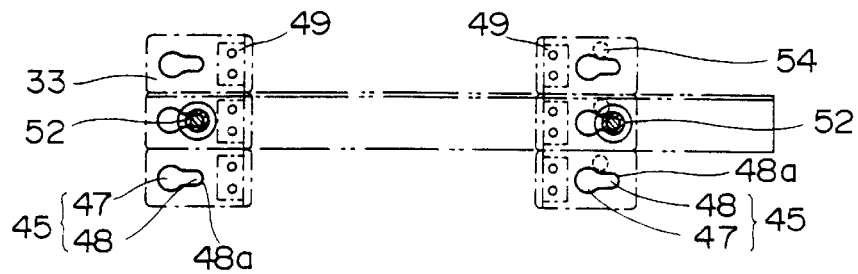
F I G. 7(d)
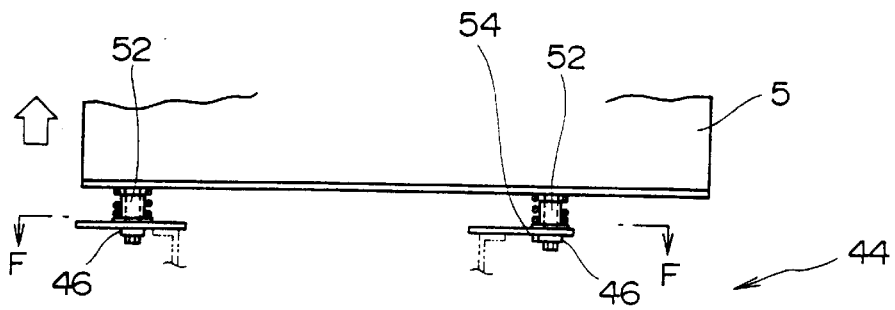
F I G. 7(e)
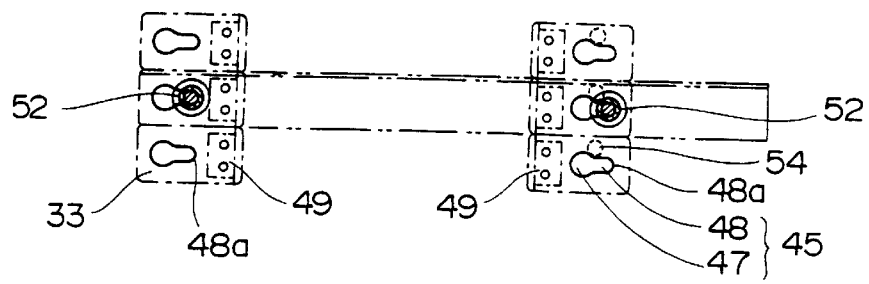
F I G. 7(f)

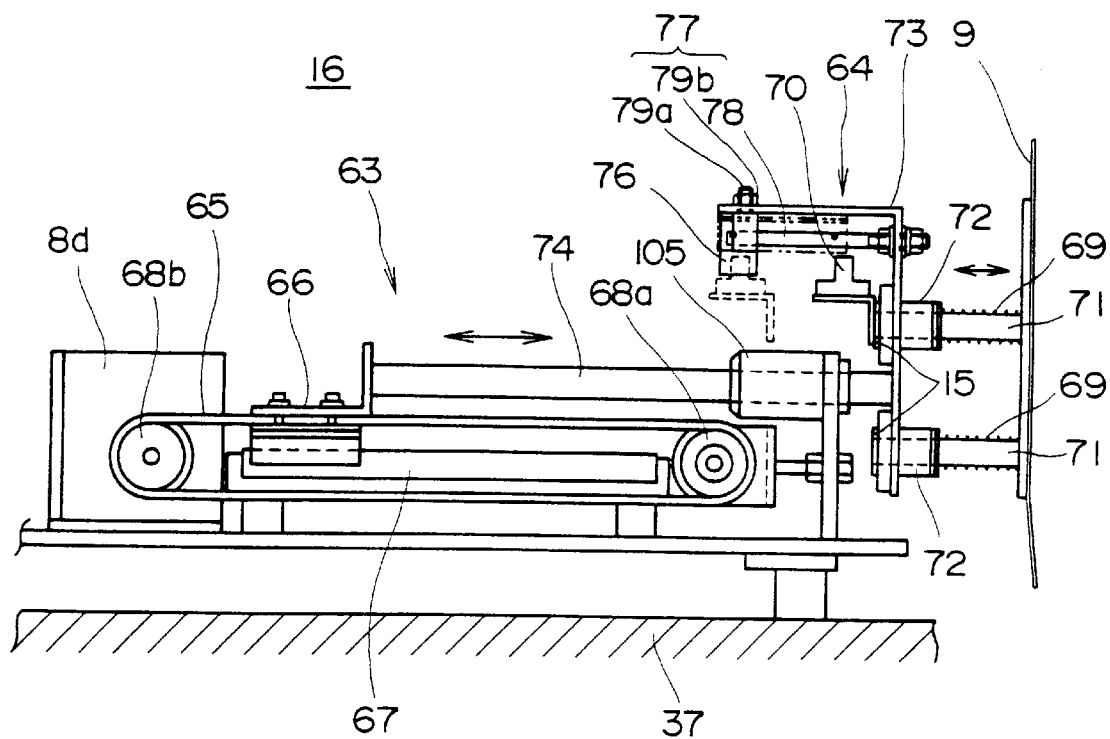
F I G. 8(a)
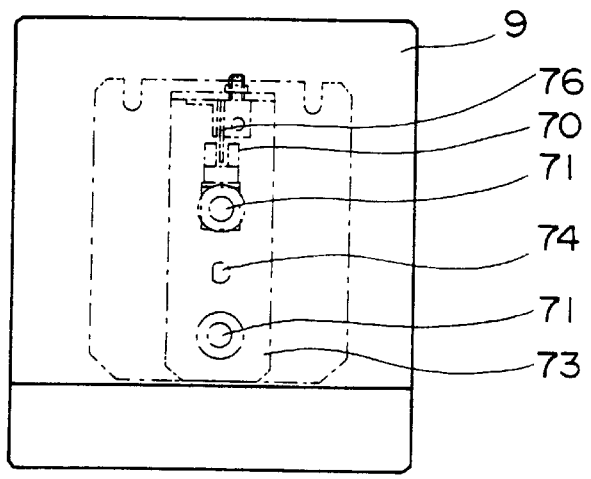
F I G. 8(b)

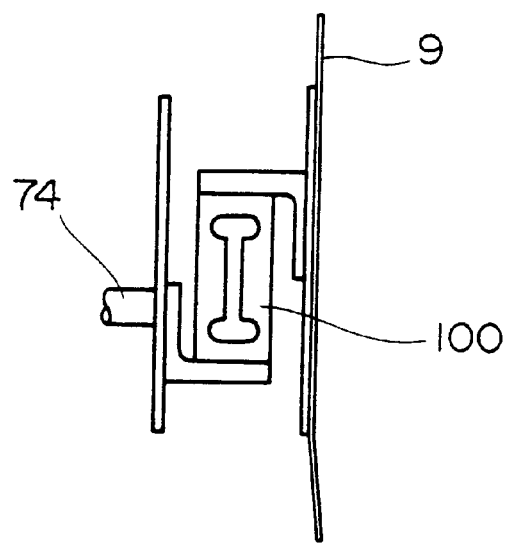
F I G . 9(a)
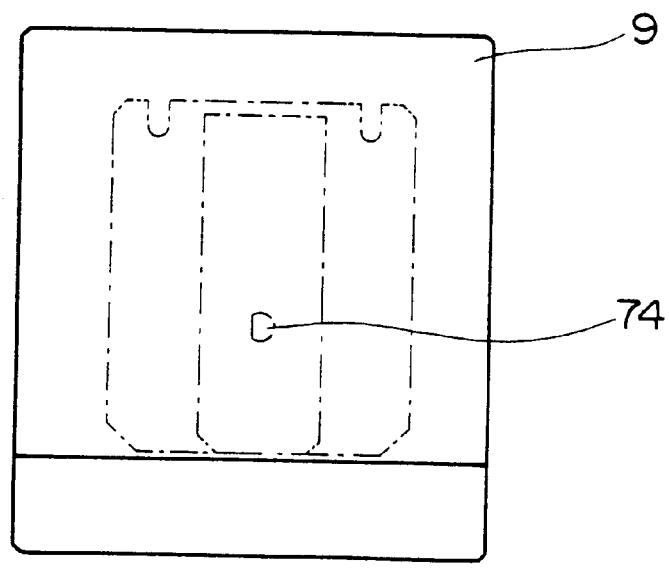
F I G . 9(b)

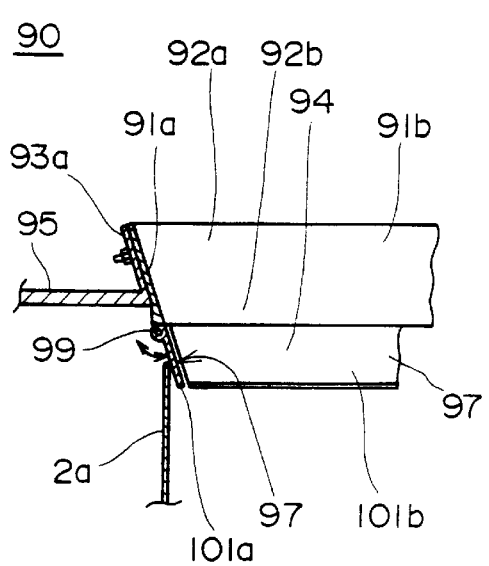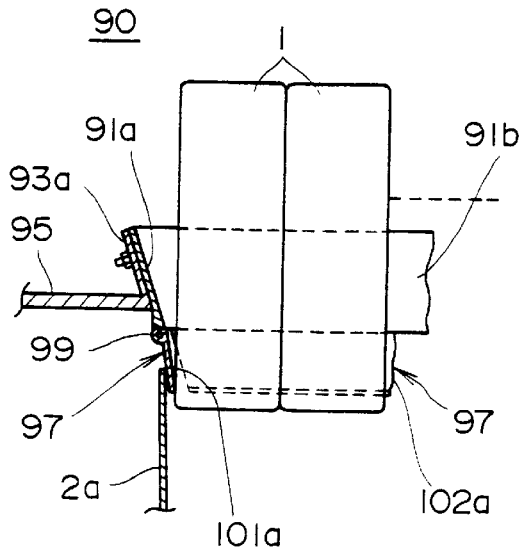
F I G .12(a)         F I G .12(b)
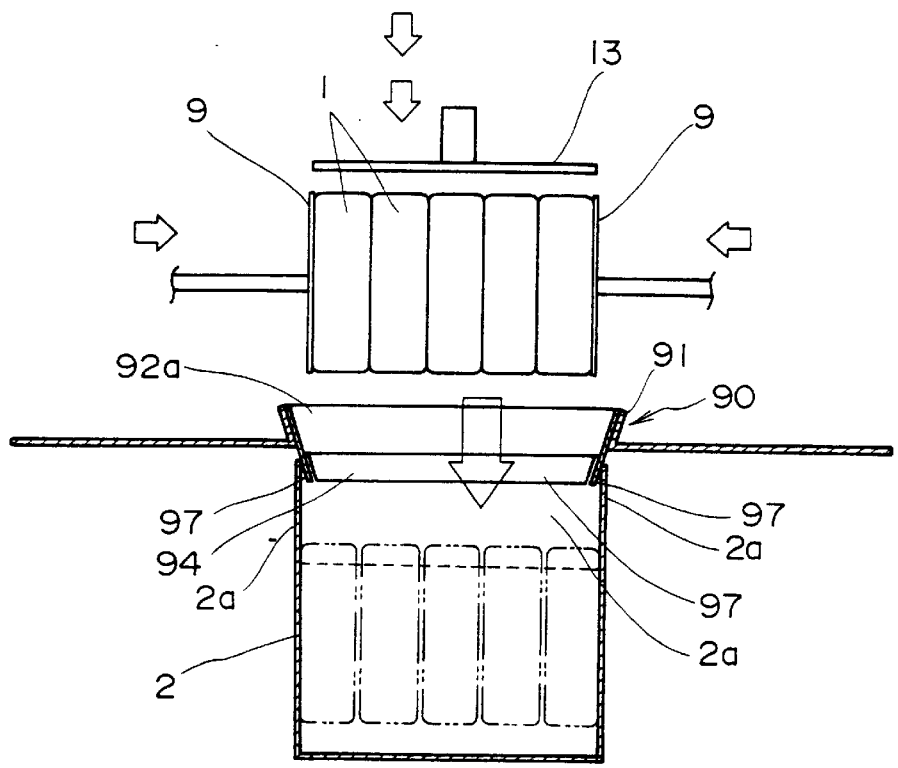
F I G .13

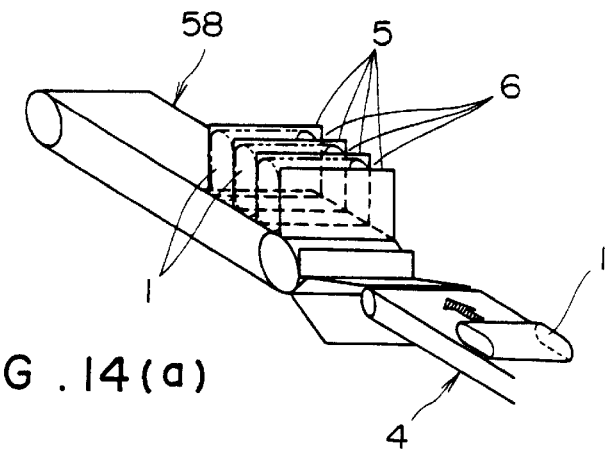
F I G . 14(a)
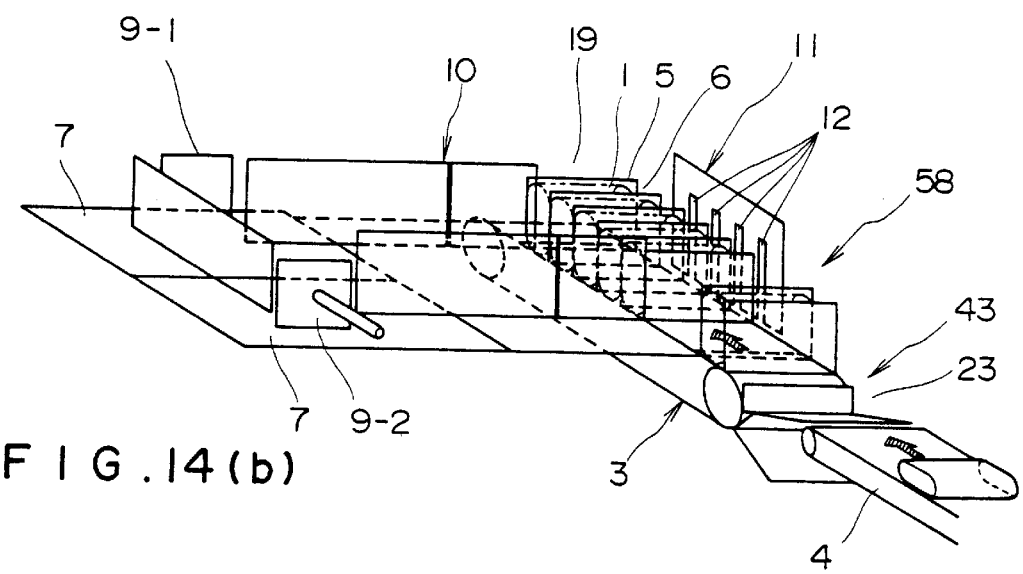
F I G . 14(b)
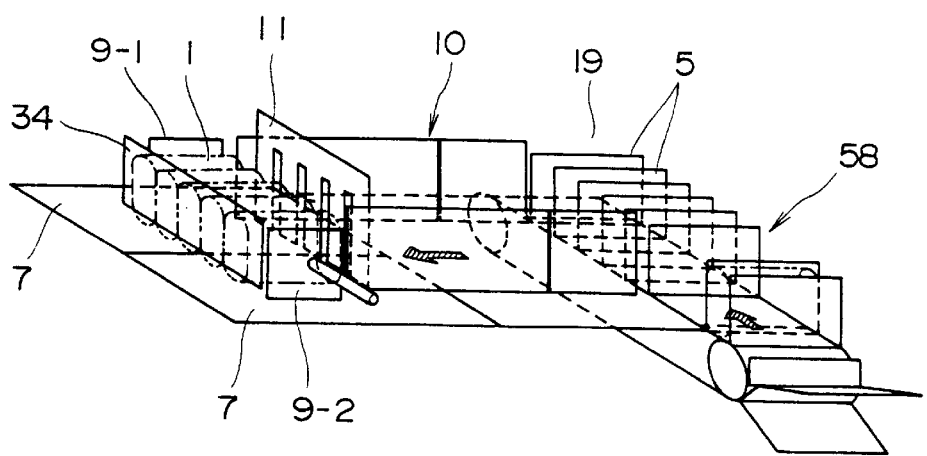
F I G . 14(c)

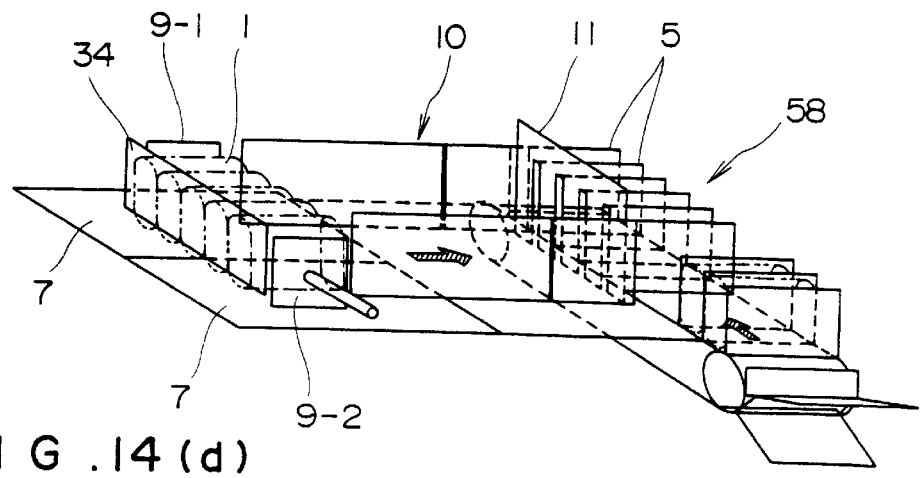
F I G . 14 (d)
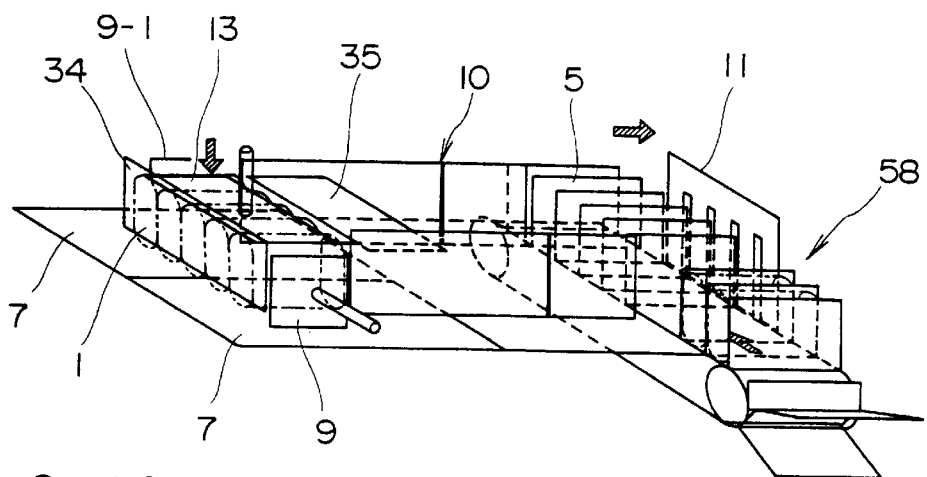
F I G . 14 (e)
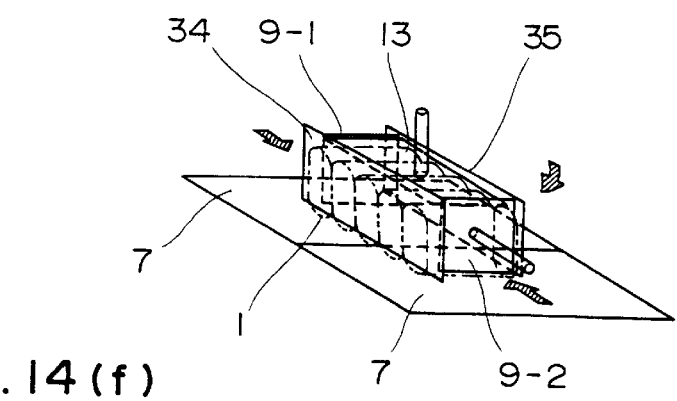
F I G . 14 (f)

BOXING SYSTEM USING CONVEYOR APPARATUS

CROSS-REFERENCE TO RELATED APPLICATION

This application is a division of the application having Ser. No. 09/338,936, filed Jun. 23, 1999, U.S. Pat. No. 6,260,689.

BACKGROUND OF THE INVENTION

This invention relates to a boxing system for putting articles, e.g. packs of food, such as potato chips, beans, pieces of candy and the likes, in boxes or cases, such as corrugated cardboard cases. This invention also relates to a conveyor apparatus useable with the boxing system.

An example of prior art boxing system is shown in Japanese Unexamined Patent Publication (KOKAI) No. HEI 9-77003 published on Mar. 25, 1997. This prior art boxing system is used to put packs 1 shown, for example, in FIG. 25(a) or boxes (not shown) in a case 2 shown, for example, in FIG. 25(c).

Referring to FIG. 25(a), packs 1 conveyed on an input conveyor 4 are put into spaces 6 formed between a plurality of adjacent ones of a plurality of fins 5 planted on the conveying surface of an alignment conveyor 3. One pack is put into one space 6. Thus, packs 1 are aligned on the conveying surface of the alignment conveyor 3, standing erect.

When a predetermined number, five in the illustrated example, of packs 1 are aligned on the conveyor 3, a pusher plate 11 pushes five packs on the conveyor 3 to move on a U-shaped intermediate member 10 onto a predetermined position on gates 7-1 and 7-2 as shown in FIG. 25(b). The pusher plate 11 has slits 12 therein to avoid interference with the fins 5 when it pushes five packs on the alignment conveyor 3. In the illustrated example, two sets of five packs 1 have been pushed onto the gates 7-1 and 7-2.

As shown in FIGS. 25(c) and 25(d), after pushing five packs 1 onto the predetermined position on the closed gates 7-1 and 7-2, the pusher plate 11 moves upward and returns to its original standby position (FIG. 25(a)) along a path above the alignment conveyor 3 in order to avoid interference with succeeding packs 1 being conveyed and aligned on the conveyor 3.

Then, as shown in FIG. 25(b), the packs 1 standing erect on the gates 7-1 and 7-2 are held by a pair of holding plates 9-1 and 9-2.

Thereafter, as shown in FIG. 25(c), the gates 7-1 and 7-2 are opened, and the cardboard case 2 is moved upward from below the gates 7-1 and 7-2 so that the ten packs 1 held between the holding plates 9-1 and 9-2 are put into the cardboard case 2. The cardboard case 2 has been conveyed on a roller conveyor (not shown) to a predetermined position below the gates 7-1 and 7-2. The cardboard case 2 has four flaps 2a–2d.

Next, a stuffing plate 13 disposed above the gates 7-1 and 7-2 is lowered, and, at the same time, the holding plates 9-1 and 9-2 are moved in the direction away from each other. In this manner, packs 1 are placed in the cardboard case 2, as shown in FIG. 25(c).

Then, the cardboard case 2 with packs 1 put therein is lowered, and the gates 7-1 and 7-2 are closed, so that the boxing system returns to the state shown in FIG. 25(a) to thereby complete one cycle of operation. This operation is repeated.

In the above-described prior art boxing system, the alignment conveyor 3 must be stopped at the pushing position shown in FIG. 25(a) when the pusher plate 11 pushes five packs 1 on the alignment conveyor 3 onto the intermediate member 10. It disadvantageously prevents packs 1 conveyed by the input conveyor 4 from being continuously supplied onto the alignment conveyor 3. Another problem is as follows. When one set of five packs 1 is pushed off the alignment conveyor 3, a next set of five packs 1 may have been already available. However, such new set cannot be brought to the pushing position at a high speed, since the alignment conveyor 3 should move at a speed low enough to receive packs 1 supplied by the input conveyor 4 without fail. These problems impede the improvement of the boxing efficiency of prior art systems.

For conveying and boxing thick packs in a case, the spacing between adjacent fins 5 should be increased. The fins 5 are screwed to the conveying surface of the conveyor 3. In order to widen the spaces 6, the fins 5 must be unscrewed, which requires time and labor.

As shown in FIG. 25(a), the holding plates 9-1 and 9-2 are arranged to advance by a predetermined stroke to press against a given number of packs 1 between them. Accordingly, if each of the five aligned packs 1 to be held is relatively thick, there is a danger that the holding plates 9-1 and 9-2 may crush items contained in the packs 1. On the other hand, if the sum thickness of the five packs 1 is relatively small, they may slip off from between the holding plates 9-1 and 9-2. Accordingly, a predetermined number of packs 1 may not be boxed neatly. Thus, it is not always possible for the holding plates 9-1 and 9-2 of the prior art system to hold different sized packs with force appropriate for such packs.

Further, since the holding plates 9-1 and 9-2 hold packs 1 by applying holding forces along the line on which packs 1 are aligned in a row, all or some of aligned packs 1 may slip out from the row in the lateral direction. Such packs 1 may be caught by the upper edge of a side-wall of the case 2, and, therefore, sometimes, proper boxing of packs 1 cannot be done.

Sometimes, a large number of packs 1 may be in so long a row, being held between the holding plates 9-1 and 9-2, that one or more of packs 1 may slip off.

If the force given by the holding plates 9-1 and 9-2 to the row of packs 1 is increased to prevent such slip-off of packs, the packs may be sometimes damaged. Accordingly, there is some limit on the holding force applied by the plates 9-1 and 9-2.

In prior art systems, in order for packs 1 to be put into a case easily, the case should have a relatively large opening, which means that large-sized cases 2 are required. This necessitates a relatively large space for storing the packed cases 2.

An object of the present invention is to provide a boxing system in which a desired number of packs can be put into cases at a high rate without fail.

Another object of the present invention is to provide a conveyor apparatus which can be used in the boxing system and which includes a plurality of easily detachable fins, between adjacent ones of which packs conveyed to be put into a case are disposed and supported.

Still another object of the invention is to provide such fins between adjacent ones of which packs can be supported, standing erect without bend, so that the packs can be put into cases, being erected.

SUMMARY OF THE INVENTION

According to a first aspect of the present invention, a conveyor apparatus is provided, which includes a group of first partitioning means mounted on first conveying means with spaces provided along a conveying direction between adjacent ones of the first partitioning means. Each of the spaces is sufficiently large to hold an article in it. The first partitioning means are adapted to pass through an article loading position where articles are put into respective ones of the spaces and an article unloading position where the articles held in the spaces are unloaded. The conveyor apparatus further includes a group of second partitioning means mounted on second conveying means with spaces provided along the conveying direction between adjacent ones of the second partitioning means. Each of the spaces is also sufficiently large to hold an article in it. The second partitioning means are also adapted to pass through the article loading position and the article unloading position. There are further provided driving means for driving the first and second conveying means independent from each other, and control means for causing the group of first or second partitioning means after being loaded or unloaded, to travel to the unloading or loading position at a speed higher than the speed at which the partitioning means pass through the loading position.

The control means cause either one of the groups of first and second partitioning means to pass through the loading position at a predetermined article receiving speed, while causing the other group to be placed in the unloading position.

The conveyor apparatus may be arranged so that while one of the groups of first and second partitioning means is being loaded in the loading position, the other group, after being unloaded, stands by for the loading at a position before the loading position. Alternatively, it may be so arranged that while one of the groups is being loaded in the loading position, the other group, after being loaded with articles, stands by for the unloading at a position before the unloading position.

According to a second aspect of the invention, a conveyor apparatus includes conveying means, and a plurality of partitioning means mounted to the conveying means. Each of the partitioning means is detachably mounted to the conveying means by means of partitioning means mounting means, and is spaced from adjacent ones along a conveying direction to provide spaces therebetween sufficient to hold articles therein. Each of the partitioning means mounting means includes a through-hole formed in either of the conveying means and the partitioning means. The through-hole has wider and narrower openings communicating with each other. Each of the partitioning means further includes a partitioning means retainer mounted by an elongated member to the other of the conveying means and the partitioning means. The retainer is adapted to be inserted into the wider opening of the through-hole and, then, moved into the narrower opening to contact the periphery of the narrower opening. A spring is adapted to press the retainer in the narrower opening against the periphery of the narrower opening. The partitioning means further includes a detent for preventing the retainer pressed against the periphery of the narrower opening from moving into the wider opening.

According to a third aspect of the present invention, a boxing system for putting articles into a box is provided. The boxing system includes an article holding arrangement including holding members for holding a predetermined number of aligned articles to be put in a box. The holding arrangement includes a driving unit for moving the holding members toward and away from each other along a direction in which the articles are aligned. A force detecting unit detects forces with which the holding members press the aligned articles when the holding members are driven toward each other. The holding arrangement further includes means for stopping the driving unit from driving the holding members when the forces applied to the holding members as detected by the force detecting unit is greater than a predetermined value.

According to a fourth aspect of the present invention, a boxing system for putting articles into a box is provided. The boxing system includes front and rear holding members for holding a predetermined number of aligned articles to b put in a box, by applying force to the aligned articles in the direction of alignment. The system further includes side holding members for holding the aligned articles held by the front and rear holding members, by applying force to the aligned articles in the direction perpendicular to the direction of alignment.

According to a fifth aspect of the present invention, a boxing system for putting articles into a box is provided, which include holding members for holding a predetermined number of aligned articles, and a funnel-shaped guide into which the aligned articles held by the holding members are forced to thereby put the aligned articles into a box disposed at an outlet port of the funnel-shaped guide. The outlet port of the funnel-shaped guide includes guide plates which can be pushed outward by the articles passing therethrough and return to the original position when the articles have passed, and biasing means for biasing the guide plates to the original positions.

According to a sixth aspect of the present invention a conveyor apparatus includes conveying means travelling in a loop including upper and lower paths with turning paths between the upper and lower paths, and a plurality of partitioning means mounted to the conveying means. Each of the partitioning means is detachably mounted to the conveying means by means of partitioning means mounting means, and is spaced along a conveying direction from adjacent ones to provide spaces therebetween sufficient to hold articles therein. Successive ones of the spaces are adapted to be loaded with articles when the partitioning means pass through a predetermined loading position in the turning path from the lower path to the upper path. Driving means drives the conveying means. Each of the partitioning means includes a partition standing erect and extending in the direction perpendicular to the conveying direction, and a base connected to the partition. Each of the partitioning means mounting means includes a mounting device secured to the base of the partitioning means, and an engaged device adapted to be engaged by an associated mounting device. The engaged devices are secured to the conveying means along the conveying direction with a fixed pitch.

The engaged devices are arranged such that plural types of partitioning means with different distances between the mounting devices and the partitions can be mounted to the conveying means. The conveyor apparatus further includes control means for changing the amount by which the partitioning means are advanced to receive articles in the loading position, in accordance with the distance between the mounting devices of adjacent ones of the partitioning means.

The number of different types of partitioning means may be two.

Each of the partitioning means mounting means may include a through-hole formed in either of the conveying means and the partitioning means, which has wider and narrower openings communicating with each other, a partitioning means retainer mounted by an elongated member to the other of the conveying means and the partitioning means, which retainer is adapted to be inserted into the wider opening of the through-hole and, then, moved into the narrower opening to contact the periphery of the narrower opening. Each of the partitioning means mounting means further includes a spring adapted to press retainer in the narrower opening against the periphery of the narrower opening, and a detent for preventing the retainer pressed against the periphery of the narrower opening from moving into the wider opening.

BRIEF DESCRIPTION OF THE DRAWINGS

FIG. 5 is a side view of the boxing system shown in FIG. 3.

FIGS. 6(a), 6(b) and 6(c) illustrate a fin-mounting arrangement for mounting fins to the alignment conveyor system shown in FIG. 1, in which FIG. 6(a) is an enlarged front view of a press-down limiting member contacting a fin-retainer together with a fin-mounting fitting, FIG. 6(b) is an enlarged front view of the press-down limiting member shifted upward away from the fin-retainer member, and FIG. 6(c) is an enlarged plan view of the fin-mounting fitting.

FIGS. 7(a) through 7(f) illustrate how the fin is mounted to the alignment conveyor system, in which FIG. 7(a) is a front view of the fin-mounting arrangement with the fin-retaining member inserted into a wider opening of a through-hole formed in the fin-mounting fitting, FIG. 7(b) is a partially cross-sectional view along a line B—B in FIG. 7(a), FIG. 7(c) is a front view of the fin-mounting arrangement with the fin-retainer slid into a narrow opening of the through-hole in the fin-mounting fitting, FIG. 7(d) is a partially cross-sectional view of along a line D—D in FIG. 7(c), FIG. 7(e) is a front view of the fin-mounting arrangement with the fin-retainer abutting the lower surface of the portion of the fin-mounting fitting around the narrow opening of the through-hole, and FIG. 7(f) is a partially cross-sectional view along a line F-F in FIG. 7(e).

FIGS. 8(a) and 8(b) are front and side views respectively of one of holding plate moving apparatuses for moving pack holding plates of the boxing system toward and away from each other.

FIGS. 9(a) and 9(b) are front and side views respectively of an example of a force detector other than the one used in the apparatus shown in FIGS. 8(a) and 8(b).

FIGS. 12(a) and 12(b) are cross-sectional views of a part of the guide shown in FIG. 11, showing guide plates extending straight and guide plates pressed outward by packs, respectively.

FIG. 13 is a cross-sectional view of the guide mounted in operational relation to the boxing system.

FIGS. 14(a) through 14(j) are perspective views illustrating how packs are put into a box, in which FIG. 14(a) shows packs being supplied to the alignment conveyor system, FIG. 14(b) shows the packs arranged on the alignment conveyor system, FIG. 14(c) shows a pusher plate pushes the packs out from the alignment conveyor system, FIG. 14(d) shows the pusher plate staying in front of the alignment conveyor system, FIG. 14(e) shows the pusher plate which has returned to its original position, FIG. 14(f) shows the packs held by the front and rear holding plates and a side holding plate, FIG. 14(g) shows the lifted case with gates opened, FIG. 14(h) shows a lowered stuffing plate with the front and rear holding plates moved away from the packs, FIG. 14(i) shows the packs pushed into the case, and FIG. 14(j) shows the gates moving to their closed position.

FIGS. 21(a) and 21(b) illustrate how the fins spaced by 2.5 inches are moved to the loading position by an amount varied for the respective fins, in which FIG. 21(a) shows the second fin receiving an pack, and FIG. 21(b) shows the third fin receiving an pack.

FIGS. 22(a) and 22(b) illustrate how the fins spaced by 2.5 inches are moved to the loading position by a fixed amount, in which FIG. 22(a) shows the second fin receiving an pack, and FIG. 22(b) shows the third fin receiving a pack.

FIGS. 23(a) and 23(b) illustrate how fins of the first embodiment spaced by 2 inches are moved to a loading position by a fixed amount, in which FIG. 23(a) shows the second fin receiving a pack, and FIG. 23(b) shows the third fin receiving a pack.

FIGS. 25(a) through 25(d) are perspective views of a prior art boxing system illustrating how packs are put into a case, in which FIG. 25(a) shows packs aligned on an alignment conveyor system, FIG. 25(b) shows the packs pushed out of the alignment conveyor system by a pusher plate, FIG. 25(c) shows the case enclosing the packs, and FIG. 25(d) show the case containing the packs is removed from holding plates.

DETAILED DESCRIPTION OF EMBODIMENTS

Figure 1:
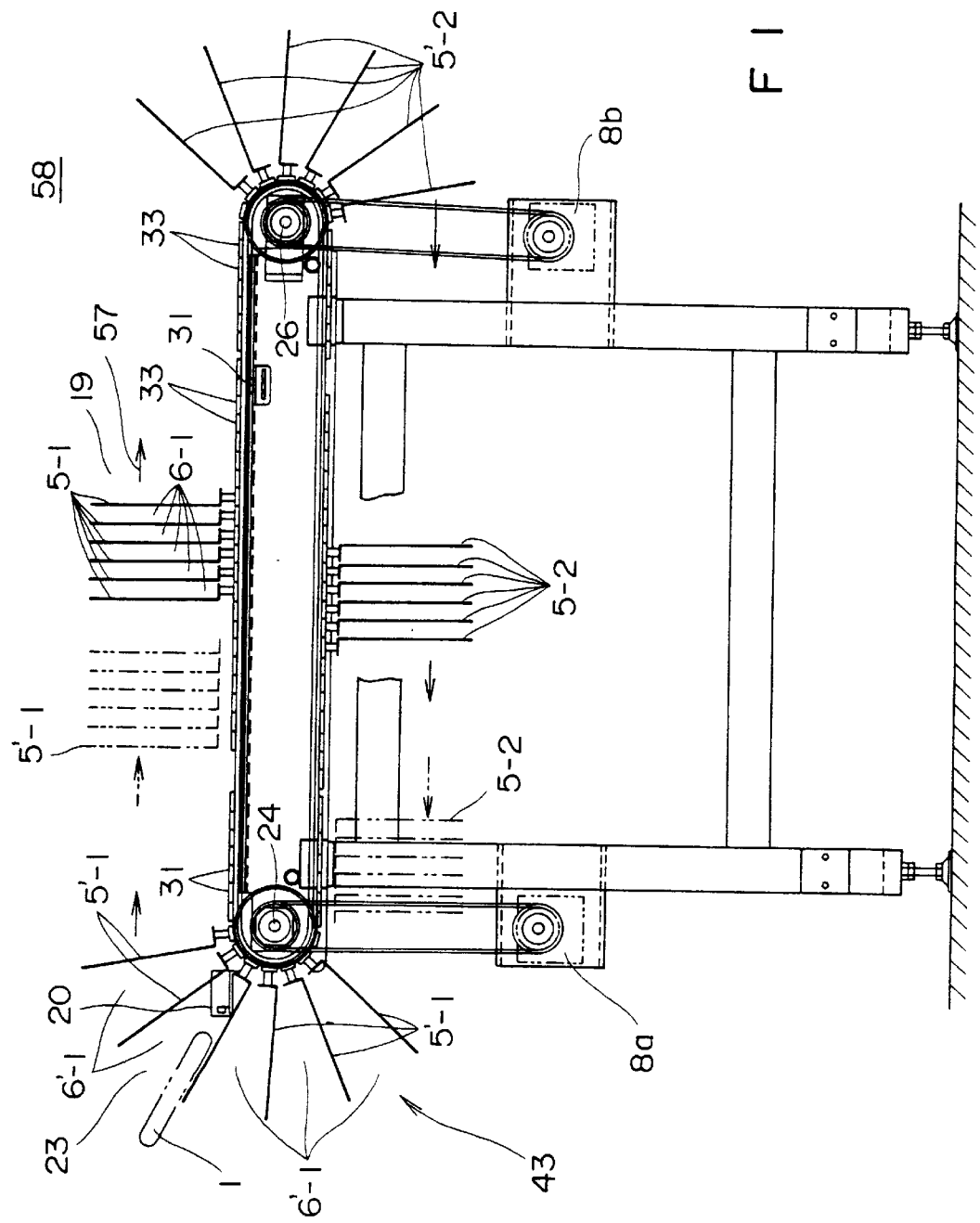
FIG. 1 is a front view of an alignment conveyor system used in a boxing system according to a first embodiment of the present invention.

Referring to the accompanying drawings, a boxing system according to a first embodiment of the present invention is described. FIGS. 14(a) through 14(j) illustrate how packs are put into a cardboard box. The boxing system shown is used to put five (5) packs 1 into a corrugated cardboard box (hereinafter referred to simply as box) 2 as shown in FIG. 14(j). The packs 1 are erected in the box 2 with their bottoms down. Of course, the boxing system can be used to put smaller boxes in the box 2.

An input conveyor or supply means 4 is linked with an alignment conveyor system 58 to supply packs 1 onto the alignment conveyor system 58. Packs 1 are successively put one by one into respective ones of pack receiving spaces 6 formed between adjacent ones of plural fins or partitioning means 5 mounted to the conveying surface of the alignment conveyor system 58. Respective packs 1 are put in the direction perpendicular to the conveyor surface so that they can erect upright in the respective pack receiving spaces 6. The alignment conveyor system 58 is driven by two stepping motors 8a and 8b (FIG. 1) to advance intermittently. The motors 8a and 8b are controlled by a control system to cause the fins 5 to advance in such a manner that one of packs 1 conveyed by the input conveyor 4 is put input each space 6. Although not shown in FIGS. 14(a) through 14(j), two sets of six fins 5, namely, a fin set 5-1 and a fin set 5-2, and two sets of six fins 5', namely a fin set 5'-1 and a fin set 5'-2, are mounted to fin-mounting fittings 33 secured to the alignment conveyor system 58 (FIG. 1).

In the example shown in FIG. 1, the pitch of the fin-mounting fittings 33 is one (1) inch, and six fins 5 are mounted to the respective ones of six successive pairs of fin-mounting fittings 33 so that adjacent fins are spaced by one inch.

The motor 8a drives two of the four fin sets, while the motor 8b drives the remaining two fin sets. Packs 1 are successively conveyed to an unloading station 19 by the fins 5 of the four fin sets.

In this specification, the reference numeral "5" when used singly refers generally to one or all of the fins used. Similarly, the reference numeral "6" when used singly refers generally to one or all of the pack receiving spaces.

Next, when a predetermined number, e.g. five, of packs 1 put into five pack receiving spaces 6 between the fins 5 on the conveyor system 58 are brought to the unloading station 19, being aligned with each other, a pusher plate (unloading means) 11 pushes the five packs 1 aligned on the conveyor system 58, as shown in FIG. 14(b). The pusher plate 11 has slits 12 therein through which the fins 5 can pass when the pusher plate 11 moves across the alignment conveyor system 58.

Then, as shown in FIG. 14(c), the five packs are pushed out of the conveyor system 58 through a generally U-shaped corridor 10 onto a pair of gates 7. The pusher plate 11 is driven to move laterally across and above the alignment conveyor system 58 by a later-described linear driver 55 (see, for example, FIGS. 3–5). Thus, the pusher plate 11 can push five packs 1 on the alignment conveyor system 58 to move through the corridor 10 onto the gates 7 in the closed holding state. A stop plate 34 shown in FIG. 14(c) acts to prevent the packs 1 from being pushed further on the gates 7 and also align the five packs 1 in a row.

The pusher plate 11 is driven to move to push packs 1 out of the alignment conveyor system 58 when the conveyor system 58, which is intermittently driven to move, is temporarily stopped at a predetermined position. Depending on the width of the row of aligned packs 1 and the number of rows of packs 1 to be put into the box 2, the number of reciprocal movements and the stroke of respective movement of the pusher plate 11 may be changed appropriately.

After pushing packs 1 to the predetermined position on the gates 7, the pusher plate 11 moves back in the opposite direction and temporarily stops at a location before the alignment conveyor system 58, as shown in FIG. 14(d), and, then, further moves across the conveyor system 58, without being interfered by the fins 5, to the original position to stand by for the next pushing operation, as shown in FIG. 14(e).

Then, a stuffing plate 13 is lowered to a predetermined level to push down the top edges of the five packs on the gates 7 to thereby level the heights of the respective packs 1, as shown in FIG. 14(e).

Thereafter, as shown in FIGS. 14(e) and 14(f), a side holding plate 35, which has lain prone, is driven by a side holding plate driving arrangement 107 to rotate to the vertical position, where it presses against the sides of the five packs on the gates 7 on the alignment conveyor side to make them align. At the same time, front and rear, upright holding plates 9-1 and 9-2 located at opposite ends of a row of the five packs 1 on the gates 7 press against the front and rear ends of the row of the packs 1. Thus, the five packs 1 on the gates 7 are held by the front and rear holding plates 9-1 and 9-2, the stop plate 34 and the side holding plate 35, which are pressed against the row of packs 1 from the four sides thereof.

Figure 3:
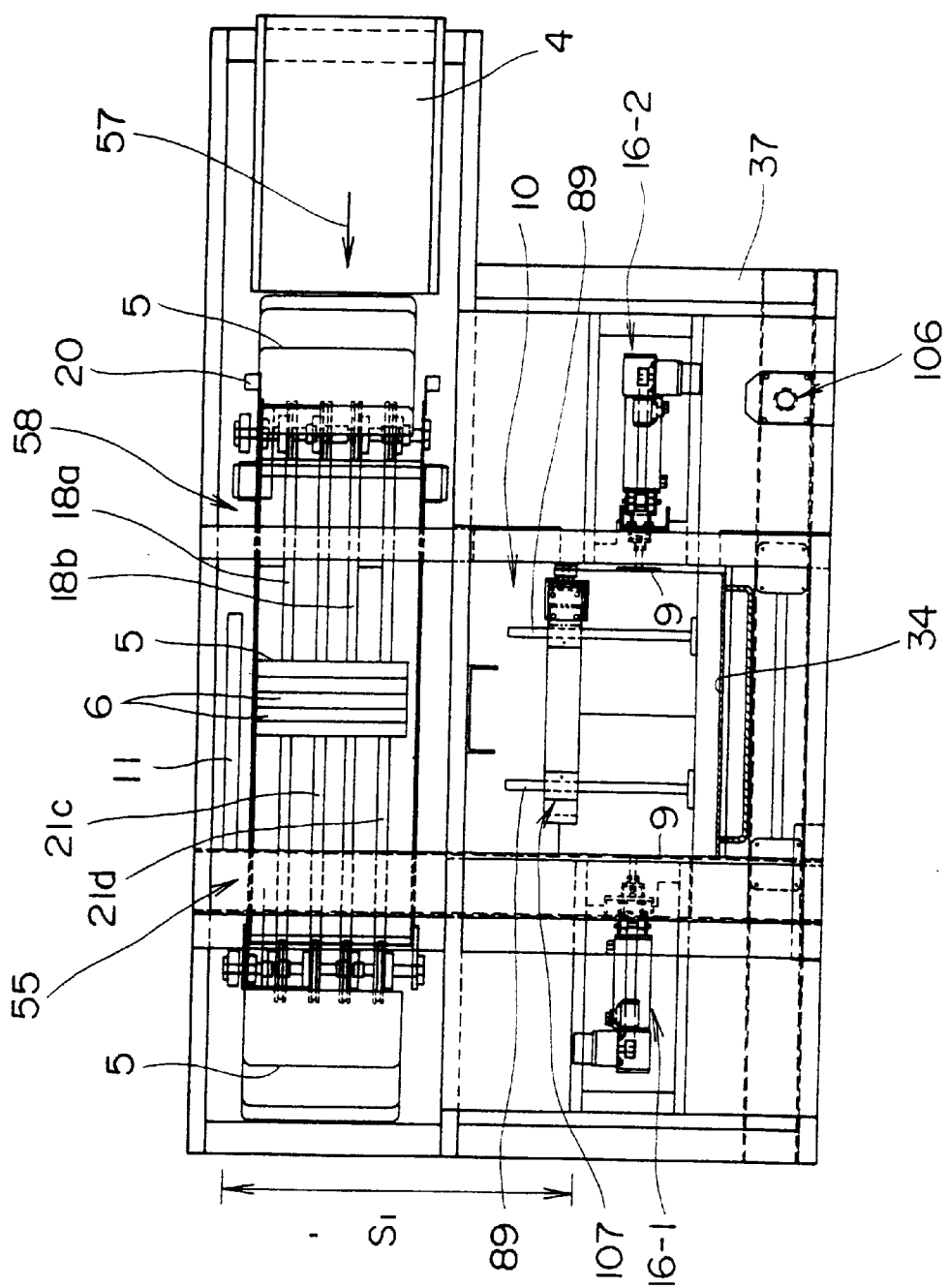
FIG. 3 is a plan view of the boxing system according to the first embodiment.
Figure 4:
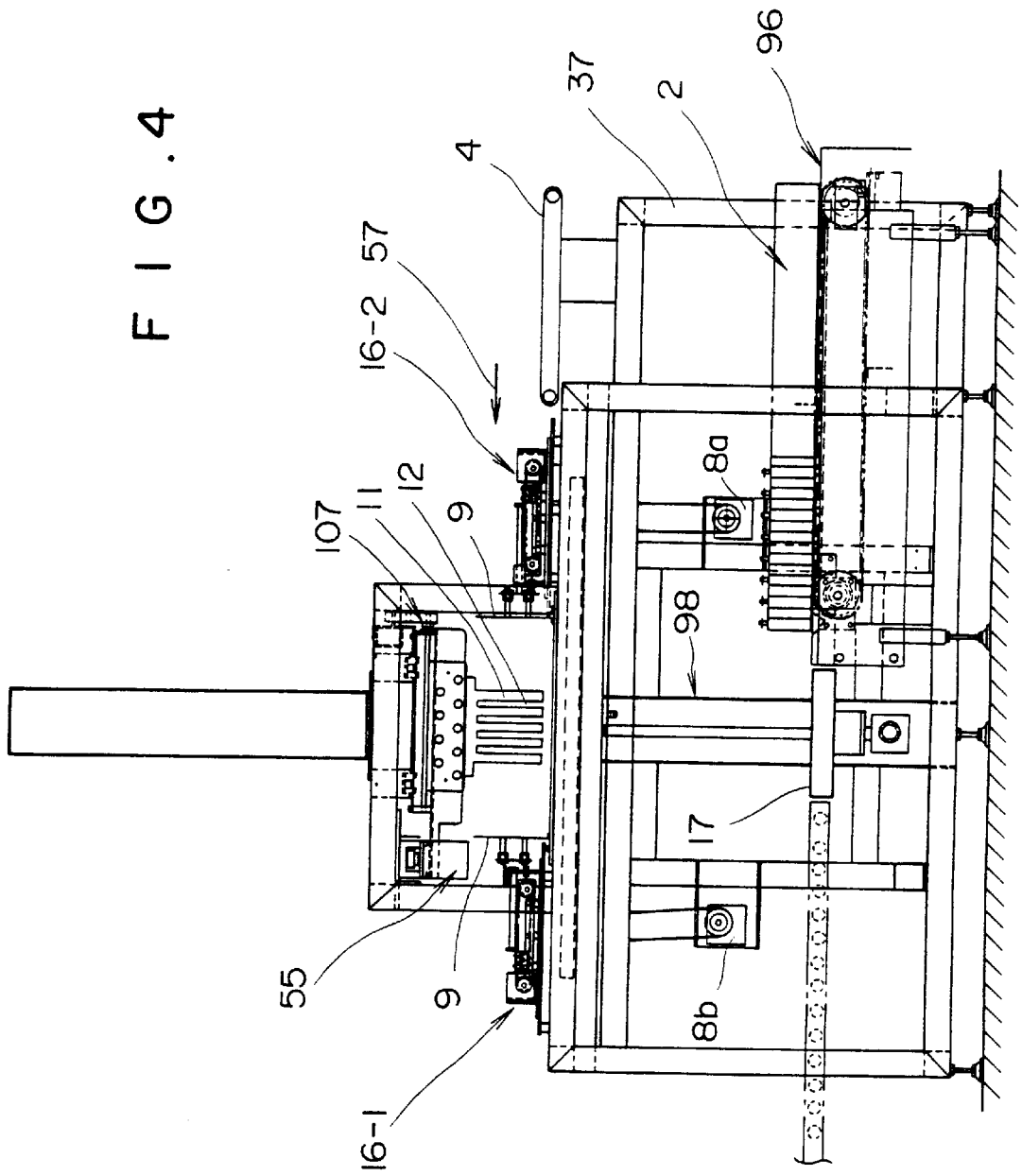
FIG. 4 is a front view of the boxing apparatus shown in FIG. 3.
Figure 14G:
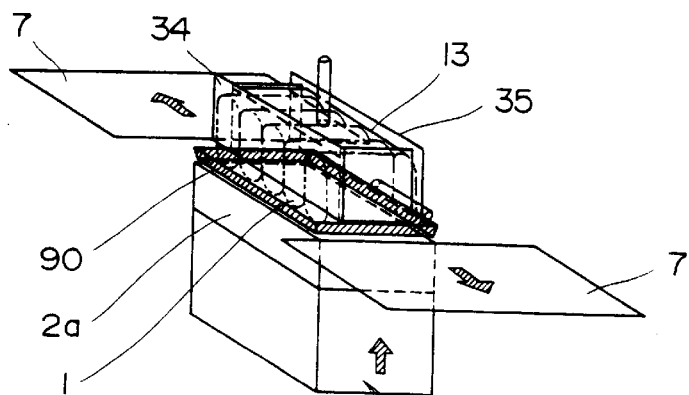

Then, as shown in FIG. 14(g), the two gates 7, which have been closed to support the five packs 1 thereon, are opened by a gate driver 106 (FIG. 3). The box 2 on a box rest 17 (see, e.g. FIG. 4) is lifted upward by a box lift 98 (see, e.g. FIG. 4) to locate below the packs 1. The box 2 has been transported by a conveyor 96 shown in FIG. 4 and has stood by on the box rest 17. A pack guide 90 guides the packs 1 when they are put into the box 2.

The front and rear holding plates 9-1 and 9-2 are, then, moved slightly in the direction away from each other by respective holding plate drivers 16-1 and 16-2 (see FIG. 3) to reduce the pressure on the five packs 1. The stuffing plate 13 is lowered to force the row of packs 1 into the bottom of the box 2. See FIG. 14(h). Then, as shown on FIG. 14(i), the side holding plate 35 is rotated back to its original prone position. The gates 7 are then closed by the gate driver 106, as shown in FIG. 14(j).

After that, the rest 17 of the box lift 98 with the box 2 containing the five packs 1 resting on it is lowered to the original standby position, where the box 2 is discharged to a discharge station. Then, a new box 2 is placed on the rest 17 of the box lift 98, the stuffing plate 13 returns to its original upward position, and the front and rear holding plates 9-1 and 9-2 return to their open positions. This completes one cycle of boxing operation. The same operation is repeated for putting another row of five packs 1 into the new box 2.

Next, the input conveyor 4, the alignment conveyor system 58 and the pusher plate 11 are described with respect to their structures and operations.

Input Conveyor 4 and Alignment Conveyor system 58

The input conveyor 4 may be a belt conveyor of synthetic rubber and moves at a high speed to convey packs 1. The packs 1 are supplied to the input conveyor 4 at substantially constant intervals from a preceding packing machine (not shown) and fed to the succeeding alignment conveyor system 58.

However, due to some operating conditions of the packing machine, the intervals at which packs 1 are fed to the input conveyor 4 may vary. An article sensor 20 disposed at the inlet end of the alignment conveyor system 58 senses packs 1 passing in front of the sensor 20, as shown in FIG. 1, which produces a pack representative signal when it senses a pack 1. The first and second stepping motors 8a and 8b for the alignment conveyor system 58 are actuated, in accordance with the pack representative signal, at such times that packs 1 are received in the respective ones of the pack receiving spaces 6 between adjacent fins 5, one for one space 6.

Figure 2:
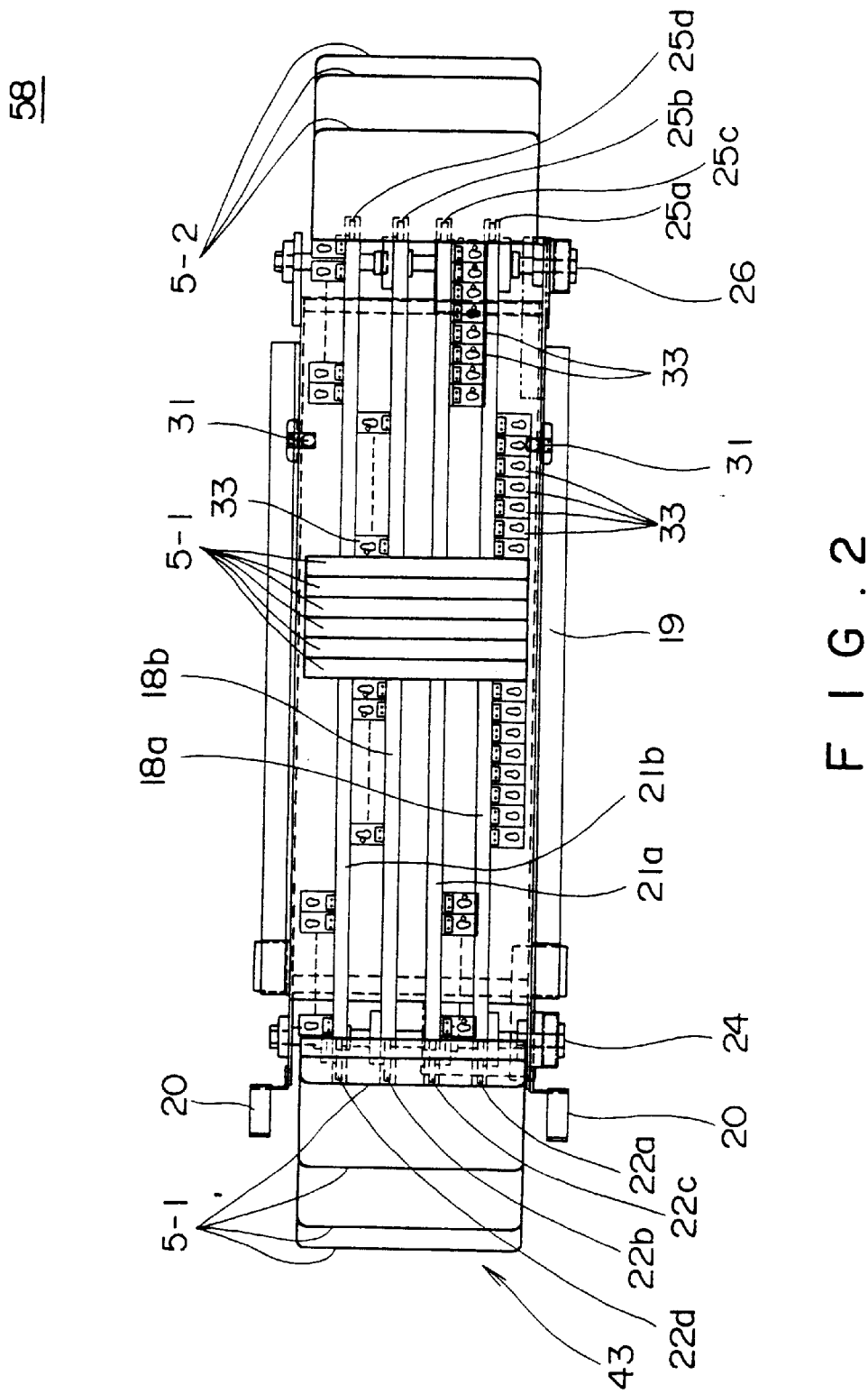
FIG. 2 is a plan view of the alignment conveyor system shown in FIG. 1.

The alignment conveyor system 58 includes four chain loops 18a, 18b, 21a and 21b, as shown in FIG. 2. The chain loops 18a and 18b belong to a first group, and the chain loops 21a and 21b belong to a second group. The first group chain loops 18a and 18b are driven to travel by the first stepping motor 8a, while the second group chain loops 21a and 21b are driven by the second stepping motor 8b. Pairs of fin-mounting fittings 33 for holding the fins 5 are mounted to the chain loops 18a and 18b at corresponding locations. A pair of fin-mounting fittings 33 is used to detachably mount one fin 5 to the first group chain loops 18a and 18b.

As shown in FIGS. 1 and 2, the first group chain loops 18a and 18b include a first set of twenty-one (21) fin-mounting fittings 33 with which at most twenty-one fins 5 can be mounted to the first group chain loops 18a and 18b, and a second set of another twenty-one fin-mounting fittings 33 with which at most twenty-one fins 5 can be mounted to the first chain loops 18a and 18b. The second set of fin-mounting fittings 33 is located halfway downstream from the first set.

The second group chain loops 21a and 21b also have first and second sets each including twenty-one fin-mounting fittings 33. The first and second sets are spaced by half the length of the loops as the first and second sets of fin-mounting fittings 33 of the first group chain loops 18a and 18b.

Thus, as shown in FIG. 1, the alignment conveyor system 58 includes a first set of fins 5-1 and a second set of fins 5-2 both of which belong to the first group and are driven by the first stepping motor 8a, and a first set of fins 5'-1 and a second set of fins 5'-2 both of which belong to the second group and driven by the second stepping motor 8b.

A first set of driving sprocket wheel wheels 22a and 22b coupled to a first driving shaft 24 for rotation therewith and a second set of follower sprocket wheel wheels 22c and 22d freely rotatable with respect to the shaft 24 are disposed at the inlet end of the alignment conveyor system 58. Also, a second set of driving sprocket wheel wheels 25c and 25d coupled to a second driving shaft 26 for rotation therewith and a first set of follower sprocket wheel wheels 25a and 25b freely rotatable with respect to the shaft 26 are disposed at the outlet end of the alignment conveyor system 58. The first group chain loop 18a is looped around the driving sprocket wheel wheels 22a and the follower sprocket wheel wheels 25a, and the other first group chain loop 18b is looped around the driving sprocket wheel wheels 22b and the follower sprocket wheel wheels 25b. Similarly, the second group chain loops 21a and 21b are looped around the driving sprocket wheel wheels 25c and the follower sprocket wheel wheels 22c and around the driving sprocket wheel wheels 25d and the follower sprocket wheels 22d. The first and second driving shafts 24 and 26 are coupled to the rotating shafts of the first and second stepping motors 8a and 8b via respective timing belts.

As shown in FIG. 1, each fin 5 is formed of a metal plate having an L-shaped cross-section and forms a pack receiving space 6 (6-1, 6'-1) with adjacent fins 5 as previously described. The length of each pack receiving space 6 along the direction of travel of the conveyor system 58 is slightly larger than the thickness of each pack 1 so that a pack 1 can be held erect with some spacing left between adjacent fins 5.

The fins 5 extend radially in the loading station 43 at the inlet end of the alignment conveyor system 58 so that pack inlet openings 23 are formed between adjacent ones of the fins 5. Each of packs 1 fed from the input conveyor 4 slides into one of the openings 23.

Packs 1 are conveyed with their bottom facing forward on the input conveyor 4 so that they can stand erect with their bottoms down in the pack receiving spaces 6.

The number of the fins 5 in each set is six so that five packs, which the pusher plate 11 can push out of the alignment conveyor system 58 at a time, can be held.

Next, the electrical circuit of the boxing system is described with reference to FIG. 15.

The boxing system includes a controller or CPU 27. The CPU 27 executes various arithmetic operations in accordance with programs stored in a memory 28 to drive the first and second stepping motors 8a and 8b, a third stepping motor 8c for operating the pusher plate 11, and other driving units.

A setting display unit 30 is connected to the controller (CPU) 27, and is used to set, for example, the speeds of the chain loops 18a, 18b, 21a and 21b and, hence the fins 5 and 5' when packs 1 are received in the pack receiving spaces 6 and 6' from the input conveyor 4 at the loading station 43, and the speeds of the fins 5 and 5' moving between the loading station 43 and the unloading station 19. The unit 30 is also used to set operation timings in various processing steps, and other settings. Such settings may be displayed by the display unit 30.

The speed at which the fins 5 and 5' are moved from the loading or unloading station 43 or 19 to the unloading or loading station 19 or 43 is higher than the speed at which they move when the pack receiving spaces 6, 6' receive packs 1 fed by the input conveyor 4. It should be noted that since, in the illustrated example, the fins 5, 5' are moved intermittently, the speed of the fins 5, 5' when packs 1 are placed in the pack receiving spaces 6, 6' is the average speed.

The CPU 27 operates to cause one of the first and second groups of fins 5 and 5' to intermittently move so that the pack receiving spaces 6 or 6' can receive packs 1 properly from the input conveyor 4 (FIG. 14(a)). At the same time, the CPU 27 causes the other of the first and second groups of fins 5 and 5' to stop or move at such a low speed as to be unloaded at the unloading station 19 while packs 1 in the pack receiving spaces 6 or 6' are pushed out of the conveyor system 58 by the pusher plate 11 (FIG. 14(b)).

The CPU 27 can be also arranged to operate in accordance with programs stored in the memory 28 to cause one set of fins (5-2 in the example shown in FIG. 1) of one of the first and second fin groups 5-1, 5-2 and 5'-1, 5'-2 to stand by at a location immediately before the loading station, while one set of fins (5'-1 in the illustrated example) of the other fin group are in the loading station 43 for loading the pack receiving spaces (6'-1) with packs 1. The CPU 27 may also be arranged to operate to cause the other, loaded fin set (5-1) of the one fin group to stand by immediately before the unloading station 19, while the one fin set (5'-1) of the other fin group are being loaded with packs 1. Both or either one of the described standby operations may be employed.

To realize it, the length of the chain loops 18a, 18b, 21a and 21b of the alignment conveyor system 58 is such that after, for example, the first fin set (5-1) of the first group is unloaded, the second fin set (5-2) of the first group can be in the standby position indicated in phantom before the loading station 43, and that the loaded first fin set (5'-1) can be in the standby position indicated by phantom before the unloading station 19. It should be noted that in FIGS.

14(a)–14(e), the conveyor system 58 is shown schematically, and, therefore, the length of the chain loops are shown shorter for simplicity of explanation.

Also, connected to the CPU (controller) 27 are an unloading station sensor 31, the article sensor 20 and a pusher sensor 42, which will be described later in greater detail. Also, pulse generators 32a, 32b and 32c are connected to and controlled by the CPU 27 to provide pulses to be applied to drivers 39a, 39b and 39c, respectively, for driving the stepping motors 8a, 8b and 8c. Also, other sensors and drivers are connected to the CPU for controlling various units of the boxing system.

The unloading station sensor 31 senses a set of fins 5 with a predetermined number, e.g. five, of packs 1 received in the associated spaces 6 when they arrived at the unloading station 19, and make the sensed fin set stop at the unloading station 19.

The article sensor 20 senses a pack 1 when it is received in one pack receiving space 6 from the input conveyor 4 as shown in FIG. 1, and produces a pack representative signal in response to which the chain loops are driven to bring the next pack receiving space 6 to the loading position.

The pusher sensor 42 senses the pusher plate 11 when it is in its original position as shown in FIG. 14(b). When the pusher plate 11 in the original position is sensed, the packs 1 in the pack receiving spaces 6 in the unloading station can be unloaded.

The pulse generators 32a, 32b and 32c generate the numbers of pulses as instructed by the controller 27 and supply the generated pulses to the drivers 39a, 39b and 39c, respectively. The drivers 39a, 39b and 39c drive the respective stepping motors 8a, 8b and 8c to rotate by angles as determined by the numbers of pulses applied to the associated drivers 39a, 39b and 39c, respectively.

Figure 16:
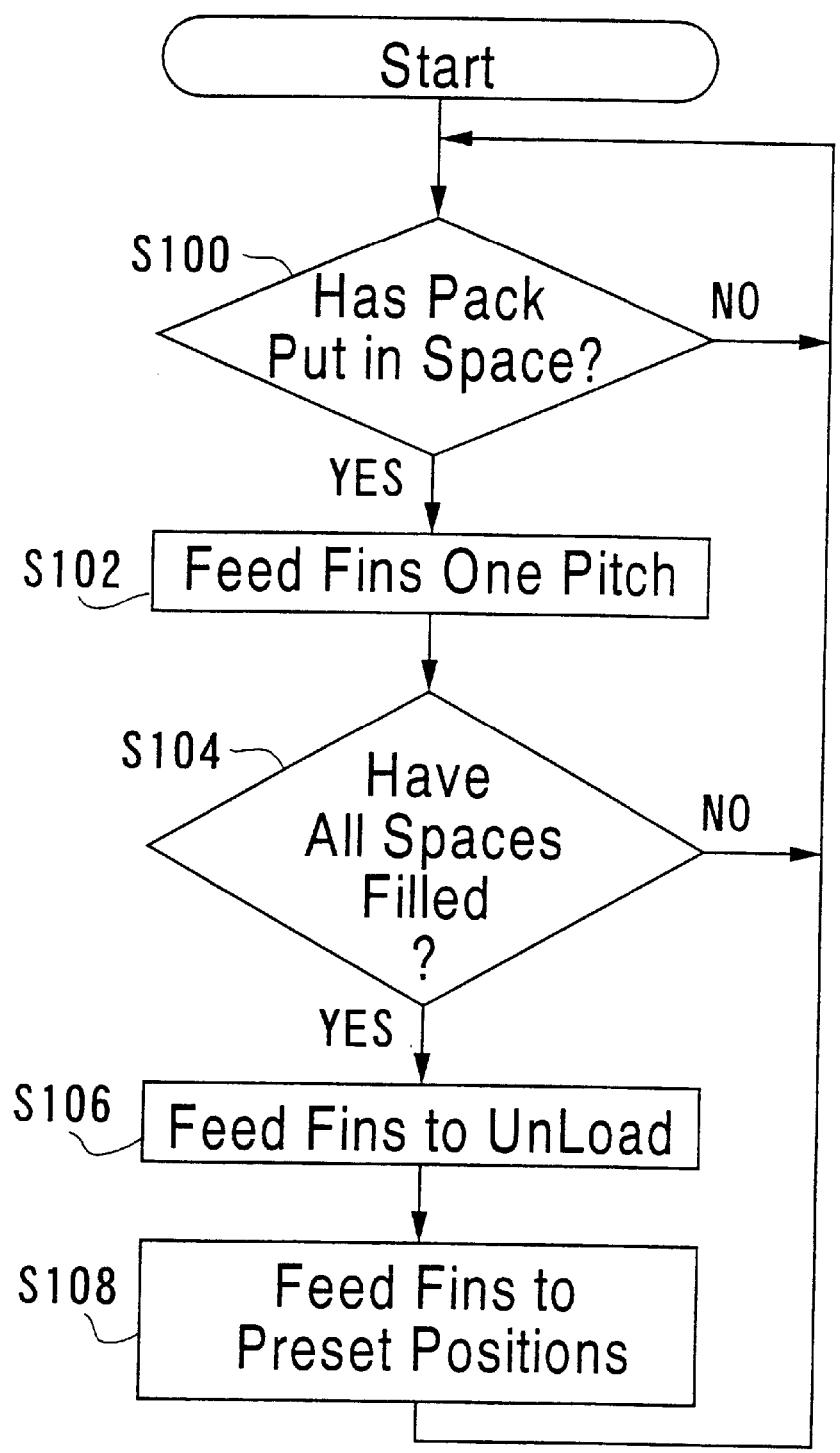
FIG. 16 is a flow chart illustrating the operation of the alignment conveyor system used in the first embodiment.

The operation of the alignment conveyor system 58 of the boxing system with the above-described arrangement is now described with reference to the flow chart shown in FIG. 16. When one fin set moves to the loading station 43, the CPU 27 makes a judgment as to whether a pack 1 is put into the first or leading one of the pack receiving spaces 6 (Step S100). If a pack 1 is in the first space 6, the stepping motor 8a or 8b associated with that fin set is driven to forward the fin set by one pitch, i.e. by such an amount that the next or second space 6 comes to the loading position where a next pack 1 is put into the second space 6 (Step S102). Each time a pack receiving space 6 is loaded with a pack 1, the CPU 27 makes a judgment as to whether or not all of a predetermined number, five in the illustrated example, of spaces 6 have been loaded with packs 1 (Step S104). If the judgment is negative, Step S100 and Step S102 are repeated until all the spaces 6 are loaded with packs 1. When it is judged that all of the five spaces 6 have been filled with packs 1, the fin set is moved to the unloading station 19 where packs 1 in the spaces 6 are to be taken out (Step S106). In this case, the speed of the fin set moving from the loading station 43 to the unloading station 19 is higher than the speed of the fin set when they move in the loading station 43. In the unloading station 19, the respective packs 1 in the spaces 6 are pushed out of the alignment conveyor system 58 by the pusher plate 11. Then, the fin set is intermittently driven to move in such a manner as to stop at a plurality of preset positions (Step S108). After that, the fin set is moved to the loading station 43 at a higher speed than it is moved in the loading station 43. It is arranged such that the fin sets do not interfere or contact with the preceding fin set.

Since the speed of the fins 5 travelling between the loading station 43 and the unloading station 19 is higher than the speed in the loading station 43, the traveling time can be reduced, which results in reduction of time required for loading and unloading of the alignment conveyor system with packs 1. Thus, according to the present invention, the efficiency of the boxing system can be improved.

Since the first and second fin groups are driven independently, packs conveyed by one fin set of one of the two fin groups can be taken off at the unloading station 19 where they are stopping or moving at a low speed, while the fins 5 of a fin set of the other group are in the loading station 43 where they are intermittently moved for receiving packs in the respective pack receiving spaces 6 at a predetermined speed.

Thus, it is not necessary to delay loading or unloading one fin group until other fin group has been unloaded or loaded, which results in reduction of the time required for one cycle of the loading and unloading of the alignment conveyor system 58.

As described previously, one fin set of one fin group shown in phantom in FIG. 1, which have been unloaded, can stand by for the loading at the standby position immediately before the loading station 43, and a fin set of one fin group shown in phantom in FIG. 1, which are carrying packs 1, can stand by for the unloading at the standby position immediately before the unloading station, while a fin set of the other fin group are being loaded with packs 1.

Thus, with the above-described arrangement, the loading and unloading of the alignment conveyor system 58 can be done continuously, which results in improvement of the efficiency of the boxing system Next, referring to FIGS. 2, 6(a)–6(c) and 7(a)–7(f), an arrangement 44 for mounting the fins 5 to the chain loops 18a, 18b, 21a and 21b is described.

The fin-mounting arrangement 44 is for detachably mounting the fins 5 to fin-mounting fittings 33 which are fixed to the first group chain loops 18a and 18b and the second group chain loops 21a and 21b. Each fitting 33 fixed to one of the first group chain loops 18a and 18b face one of the fittings 33 fixed to the other of the first group chain loops to form a pair for mounting one fin 5. Similarly, each fitting 33 fixed to one of the second group chain loops 21a and 21b face one of the fittings 33 fixed to the other of the second group chain loops to form a pair for mounting one fin 5'. In the illustrated example, twenty-one pairs of fin-mounting fittings 33 are used for each of the first and second fin groups.

Since all of the fins 5 are mounted to the chain loops in the same manner, the fin-mounting arrangement 44 is described only for one fin 5 for simplicity of explanation.

As shown in FIGS. 6(a)–6(c) and 7(a)–7(f), each of a pair of fin-mounting fittings 33 fixed to the respective ones of the chain loops 18a and 18b has a through-hole 45. Each fin 5 includes a partition 5a and a base 5b.

A retainer 46 is attached to the fin 5 on each of the opposing sides thereof.

Each fin-mounting fitting 33 is a generally rectangular plate and fixed to one of the chain loops 18a and 18b by means of a coupling member 49.

Each of the through-holes 45 has a generally round wider opening 47 and a generally elliptic narrow opening 48, which are joined together.

Each of the retainer 46 is disc-shaped and is secured by a nut 51 to the bottom end of each of a pair of shanks 50, which are spaced from each other and extend downward from the base 5b of the fin 5. The outer diameter of the retainer 46 is smaller than the inner diameter of the wider opening 47 of the through-hole 45, but it is larger than the inner diameter of the narrow opening 48. Accordingly, when the retainer 46 is inserted into the wider opening 47 of the through-hole 45 and moved to the narrow opening 48, the upper surface of the retainer 46 can contact the bottom surface of the periphery 48a of the narrow opening 48.

Each shank 50 is disposed to extend through a bore through a shorter cylindrical member 52. The cylindrical member 52 supports a larger diameter flange 52a joined to the bottom end thereof. The cylindrical member 52 and the flange 52a are movable together along the length of the shank 50.

A coil spring 53 is mounted on the member 52. The bottom end of the coil spring 53 is in contact with the flange 52a so as to press the flange 52a against the retainer 46 (FIG. 6(a)). FIG. 6(b) shows the cylindrical member 52 with the flange 52a slid upward against the spring force of the coil spring 53.

The retainer 46, the shank 50, the nut 51, the cylindrical member 52, the flange 52a and the coil spring 53 form a mounting device 59 on the fin side.

Figure 7A:
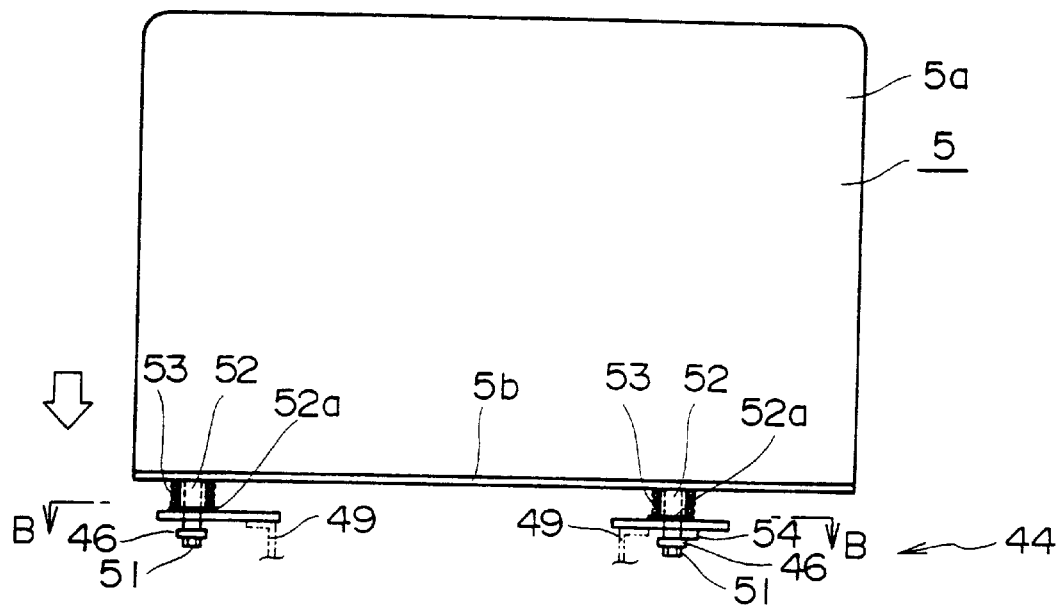

As shown in FIGS. 6(a) and 7(a), a short columnar detent 54 projects downward from the bottom end of one of a pair of fin-mounting fittings 33. The detent 54 is on the right-hand side fitting 33 in the example shown in FIGS. 6(a) and 7(a). The detent 54 is engaged by the retainer 46, which is pressed by the spring 53 against the bottom surface of the periphery 48a of the narrow through-hole portion 48, as shown in FIGS. 7(e) and 7(d), so that the retainer 46 cannot move into the wider opening 47, whereby the fin 5 does not slip off from the pair of fin-mounting fittings 33. When the retainer 46 is in engagement with the detent 54, the shank 50 is in contact with the inner periphery of the narrow opening 48 of the through-hole 45. Thus, the detent 54 acts also to position the fin 5 with respect to the pair of fittings 33.

Figure 7B:
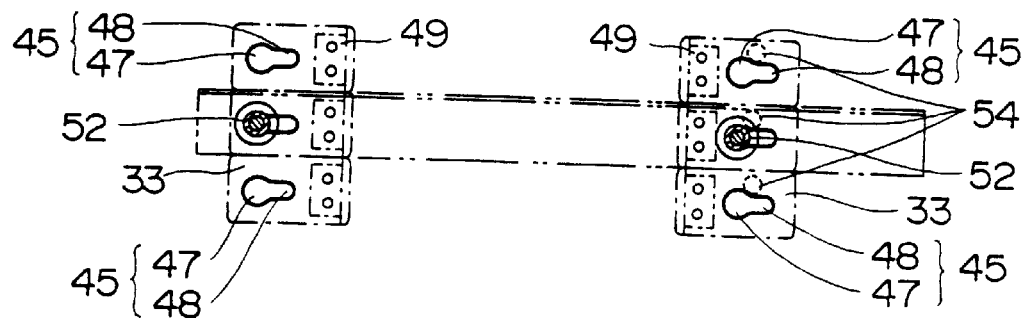

With the above-described arrangement of the fin-mounting arrangement 44, the fins 5 can be detachably mounted on respective pairs of fin-mounting fittings 33. For mounting a fin 5 to a pair of fittings 33, the fin 5 is placed with the free edge of the base 5b of the L-shaped fin facing forward. Then, as shown in FIGS. 7(a) and 7(b), a pair of retainers 46 of the fin 5 are forced into the wider openings 47 of the through-holes 45 in the respective fittings 33 against the force of the springs 53. As the fin is pressed down, the lower surfaces of the flanges 52a abut against the upper surfaces of the peripheries of the respective wider openings 47, and, therefore, the fin 5 receives a force tending to lift it upward. After that, as shown in FIGS. 7(c) and 7(d), the fin 5, being pressed down with the retainers 46 placed in the wider openings 47, is moved rightward (in FIGS. 7(c) and 7(d)) until the shanks 50 contact the right portion of the inner peripheries of the respective narrower portions 48. Since the fin 5 is pressed downward, the retainer 46 on the right side portion of the fin 5 can move over the detent 54. Then, the force to press down the fin 5 is removed so that the retainers 46 are pressed against the bottom surface of the portion of the fittings 33 around the peripheries 48a of the narrower portions 48 by the springs 53. In these positions, the retainers 46 are prevented from moving into the wider openings 47 by the detent 54, and, therefore, the fin 5 does not come off from the fin-mounting fittings 33.

For dismounting the fin 5 from the fin-mounting fittings 33, the above-described procedures are followed in the opposite direction. Specifically, the fin 5 is pressed downward against the spring force given by the springs 53 so that the retainers 46 are removed from the bottom surfaces of the peripheries 48a of the narrower portions 48 of the through-holes 45. With the retainers 46 kept off from the bottom surfaces of the fittings 33, the fin 5 is moved leftward into the wider openings 47. Since the right retainer 47 is off the bottom surface of the right fitting 33, it can move over or below the detent 54. In this position, the fin 5 can be removed from the fin-mounting fittings 33, by pulling the retainers 46 off from the wider openings 47 of the respective through-holes 45.

For accommodating packs 1 of a different thickness, the width of the pack receiving spaces 6, i.e. the dimension of the spaces 6 in the traveling direction of the fins 5, must be changed, which requires to change the locations where the respective fins 5 are mounted to the alignment conveyor system 58. As is understood from the above-description, with the fin-mounting arrangement 44 of the present invention, such change in location of the fins 5 can be done easily without resort to any tools, and the fins, after such changes in location, can be held in place by the detents 54 during the operation of the conveyor system 58. Also, it is easy to add or reduce the number of the fins 5 attached to the alignment conveyor system 58, which would be required for accommodating a different number of packs to be put in a box.

Pusher Plate 11 and Arrangement for Operating It

As best shown, for example, in FIGS. 3–5 and 14(b), the pusher plate 11 formed of metal includes a number of slits 12 therein for avoiding interference with the fins 5. Accordingly, for different numbers of the fins 5 in each fin set and for different widths of the spaces 6, different pusher plates 11 should be prepared.

The pusher plate 11 is driven by the linear driver 55. In FIG. 5, the side elevation of the linear driver 55 is shown. The linear driver 55 is mounted on a frame 37 of the boxing system and includes a reciprocating table 56, which moves on rails (not shown) along a path extending in parallel with the conveyor surface of the alignment conveyor system 58 and transverse to the traveling direction 57 of the alignment conveyor system 58. The reciprocating table 56 is adapted to move along the path over a distance of S1 shown in FIGS. 3 and 5. The pusher plate 11 is fixed to the reciprocating table 56 for movement with the table 56.

The movement of the pusher plate 11 by the distance S1 from the original position shown in FIG. 5 across the conveyor system 58 makes five packs 1 aligned on the alignment conveyor system 58 are pushed to the position between the front and rear holding plates 9-1 and 9-2.

The reciprocating table 56 is driven by a third stepping motor 8c, which, in turn, is controlled by the CPU 27. Thus, the operation of the pusher plate 11 is controlled by the CPU 27.

Being controlled by the CPU 27, the pusher plate 11 moves along a predetermined substantially horizontal path extending above and across the chain loops 18a, 18b, 21a and 21b of the alignment conveyor system 58 from the original position beside the conveyor system 58, when one of the four sets of fins 5 is in the unloading position 19, as shown in FIG. 14(b). As a result, five packs 1 held in the spaces 6 between adjacent fins 5 are pushed onto the position on the gates 7 between the front and rear holding plates 9-1 and 9-2. The pusher plate 11 is arranged to return to its original position, moving along the predetermined path in the opposite direction, without interfering with the unloaded fins 5.

Pack Holding Arrangement

As shown in FIG. 14(f), the five packs 1 pushed by the pusher plate 11 and aligned on the gates 7 are held in place by the stop plate 34, the front and rear holding plates 9-1 and 9-2, and the side holding plate 35. The front and rear holding plates 9-1 and 9-2 and the side holding plate 35 are driven by a pack holding arrangement. The pack holding arrangement includes the front and rear holding plate drivers 16-1 and 16-2 and the side holding plate driving arrangement 107 shown in FIG. 3.

As previously described, the front and rear holding plate drivers 16-1 and 16-2 drive the front and rear holding plates 9-1 and 9-2 toward and away from each other, respectively. Since the two drivers 16-1 and 16-2 have the same arrangement, only one of them is described. Accordingly, in this specification, the reference numeral "16" used alone denotes generally the holding plate drivers 16-1 and 16-2, and, similarly, the reference numeral "9" used alone denotes generally the front and rear holding plates 9-1 and 9-2.

Figure 17A:
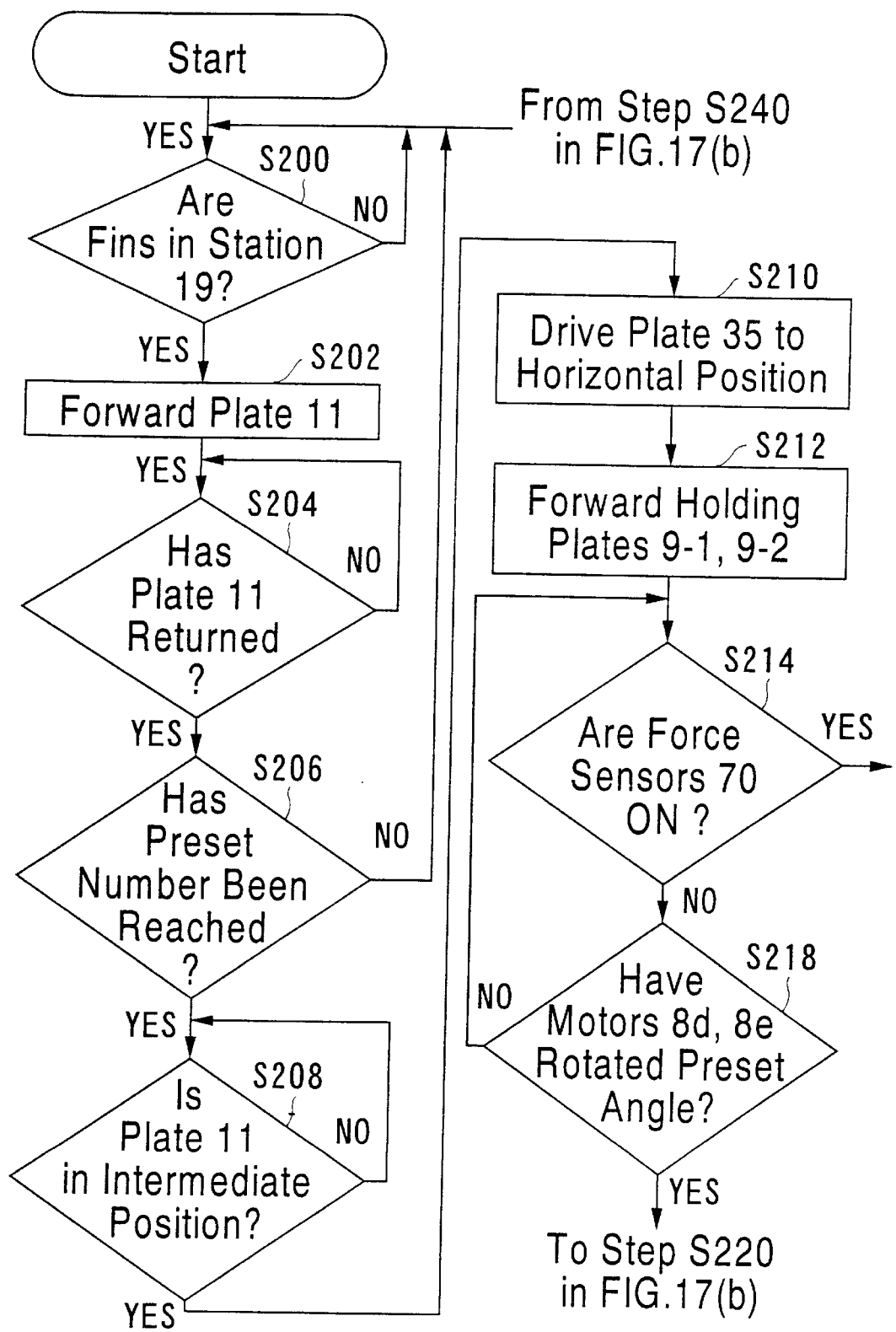
FIGS. 17(a) and 17(b) show a flow chart illustrating the operation of the front and rear holding plates and the side holding plate.
Figure 17B:
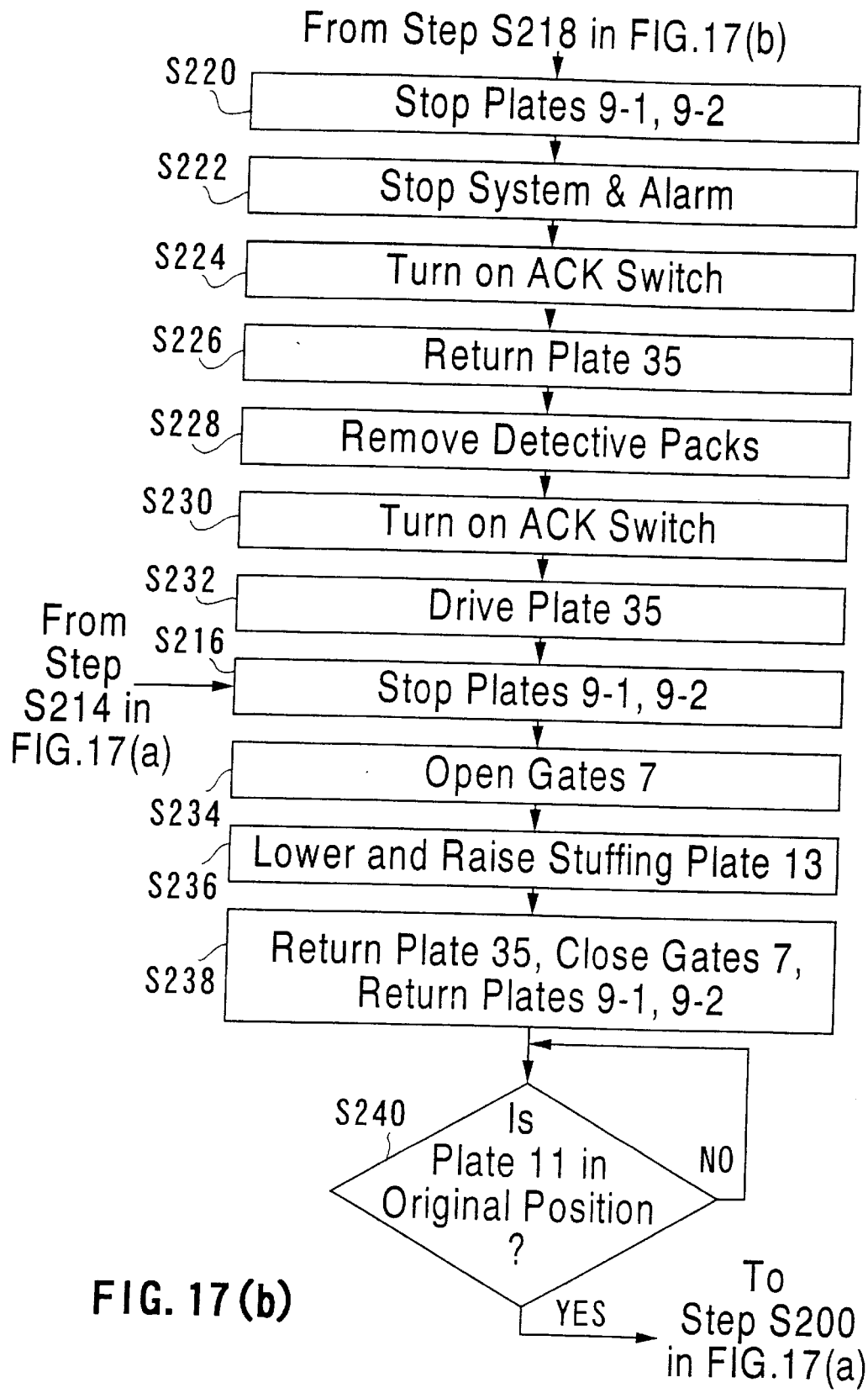

The driver 16 includes, as shown in FIGS. 8(a) and 8(b), a holding plate linear driver 63 for reciprocally moving the holding plate 9, a force detector 64 for measuring the force by which the plate 9 presses the row of packs 1, and plate stopping means for stopping the holding plate 9 provided by the control of the CPU 27 as represented by Steps S214 and S216 in the flow chart shown in FIGS. 17(a) and 17(b) which will be described later.

The holding plate linear driver 63 includes a timing belt 65 as shown in FIG. 8(a). A table 66 is connected to the timing belt 65 and is reciprocally movable on a linear guide rail 67. The timing belt 65 is looped around a follower timing pulley 68a and a driving timing pulley 68b secured to a rotary shaft of a fourth stepping motor 8d. The fourth stepping motor 8d when rotating in forward and reverse directions reciprocally moves the table 66. With the reciprocal motion of the table 66, the holding plate 9 moves back and forth. The fourth stepping motor 8d, the linear guide rail 67, the follower timing pulley 68a and the driving timing pulley 68b are secured to the frame 37.

It should be noted, however, in place of the timing belt type linear driver 63, any other suitable driving arrangement may be used to drive the holding plate 9.

The force detector 64 includes, as shown in FIGS. 8(a) and 8(b), a pair of springs 69 and a pressing force sensor 70. When the plate 9 abuts and presses against the front or rear end pack 1 aligned on the gates 7 as it is driven forward by the driver 63, the springs 69 are compressed. The pressing force sensor 70 detects when the springs 69 are compressed to a predetermined length, which means a predetermined force is applied to the pack 1. Then, the sensor 70 produces a detection signal and applies it to the controller (CPU) 27.

As shown in FIGS. 8(a) and 8(b), two parallel support rods 71 are coupled to the back surface of the holding plate 9 and are supported by bearings 72 so as to axially slide therein. The bearings 72 are secured to an L-shaped member 73, which, in turn, is coupled to the reciprocating table 66 by a sliding shaft 74. The shaft 74 is slidably supported by a bearing 105. The springs 69 are mounted over the respective support rods 71 and bias the holding plate 9 toward the packs 1 on the gates 7.

Stoppers 15 are provided at the proximal ends of the two support rods 71 opposite to the holding plate 9, for preventing the rods 71 from slipping off from the bearings 72. The force sensor 70 is secured to one, the upper one in the example shown in FIG. 8(a), of the stoppers 15 or the proximal ends of the support rod 71. The force sensor 70 includes a photosensor, which generates a signal when light incident on it is blocked by a shield 76. The signal generated by the force sensor 70 is applied to the CPU 27, which causes the rotation of the fourth stepping motor 8d and, hence, the movement of the holding plate 9 to stop.

The shield 76 is attached to the horizontal portion of the L-shaped member 73 by means of a position adjusting arrangement 77 so as to be adjustable in position. The position adjusting arrangement 77 includes a guide shaft 78 secured to the L-shaped member 73 in parallel with the shaft 74, and a bolt 79a and a nut 79b for fixing the shield 76 to the L-shaped member 73 by fastening the nut 79b.

The position of the shield 76 relative to the quiescent or original position of the sensor 70 shown in FIG. 8(a) can be changed by unfastening the nut 79b and moving the shield 76 on the guide shaft 78. After the shield 76 is brought to a desired position, the nut 79b is fastened.

In operation of the front and rear holding plate drivers 16-1 and 16-2, when packs 1 are pushed out from the alignment conveyor system 58 onto the gates 7 as shown in FIG. 14(d), the fourth stepping motor 8d and a fifth stepping motor 8e, which drives the rear holding plate driver 16-2, are rotated in the forward direction to drive the front and rear holding plates 9-1 and 9-2 forward, i.e. toward each other. The forward rotation of the stepping motors 8d and 8e continues for a while after the plates 9-1 and 9-2 are brought into contact with the opposite ends of the row of packs 1, i.e. the front end pack and the rear end pack, on the gates 7. It causes the respective L-shaped members 73 coupled to the reciprocating tables 66 to compress the respective springs 69, so that the distances between the L-shaped members 73 and the associated holding plates 9-1 and 9-2 decrease. Then, the holding plates 9-1 and 9-2 press a predetermined number, five in the illustrated example, of aligned packs 1 with a preset force by virtue of the compressed springs 69. The position of the shields 76 relative to the force sensors 70 is such that the shields 76 block the sensors 70 from incident light when the springs 69 are compressed to give the preset force to the holding plates 9-1 and 9-2. The force sensors 70, when shielded, produce the sensor signals which cause the fourth and fifth stepping motors 8d and 8e to be stopped. In this way, the front and rear holding plates 9-1 and 9-2 can hold a predetermined number of aligned packs on the gates 7 with a preset force. The CPU 27 detects this fact and proceeds to the next step.

With the above-described arrangement, packs 1 are not crushed even when the length of the row of aligned packs 1 is relatively large. Also, even when the length of the rows of aligned packs 1 is relatively short, packs 1 will not slip off from between the holding plates 9-1 and 9-2 since an appropriate force is given to them.

Sometimes, packs 1 are filled with gas, e.g. inert gas, which results in variations in thickness among packs 1. The above-described holding arrangement can reliably hold a row of such packs with an appropriate force by the holding plates 9-1 and 9-2.

Figure 15:
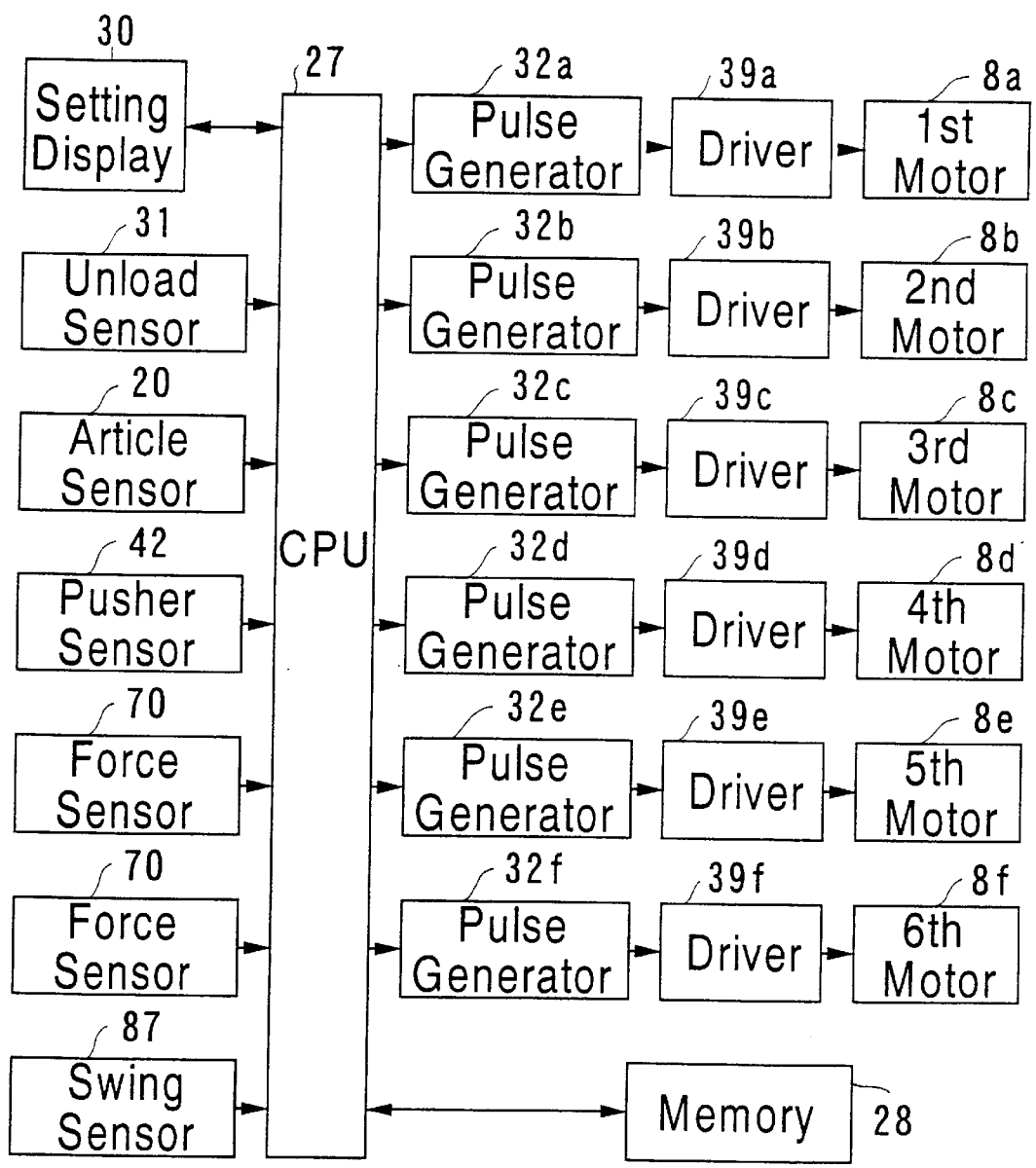
FIG. 15 is a block diagram of electrical circuitry of the boxing system according to the first embodiment of the present invention.

The maximum amount of feed, X1, by which the holding plates 9-1 and 9-2 are fed forward, can be preset through the setting display unit 30 connected to the controller (CPU) 27 (FIG. 15). The maximum amount of feed is such an amount that even when the holding plate linear driver 63 forwards tables 66 by that amount, the sensors 70 are not shielded by the shields 76 if the number of packs 1 on the gates 7 is smaller than the predetermined number. Whether the tables 66 have been fed by the maximum amount or not can be determined by measuring the angle of rotation of the stepping motor 8d and/or the stepping motor 8e, or counting the number of pulses supplied to the stepping motors. The CPU 27 is arranged to cause the fourth and fifth stepping motors 8d and 8e to stop when the tables 66 and, hence, the plates 9-1 and 9-2 are forwarded by the maximum amount X1. The CPU 27, then, may activate an alarm (not shown) to notify an operator that a smaller number of packs 1 have been supplied onto the gates 7 and may stop the operation of the boxing system.

Figure 10A:
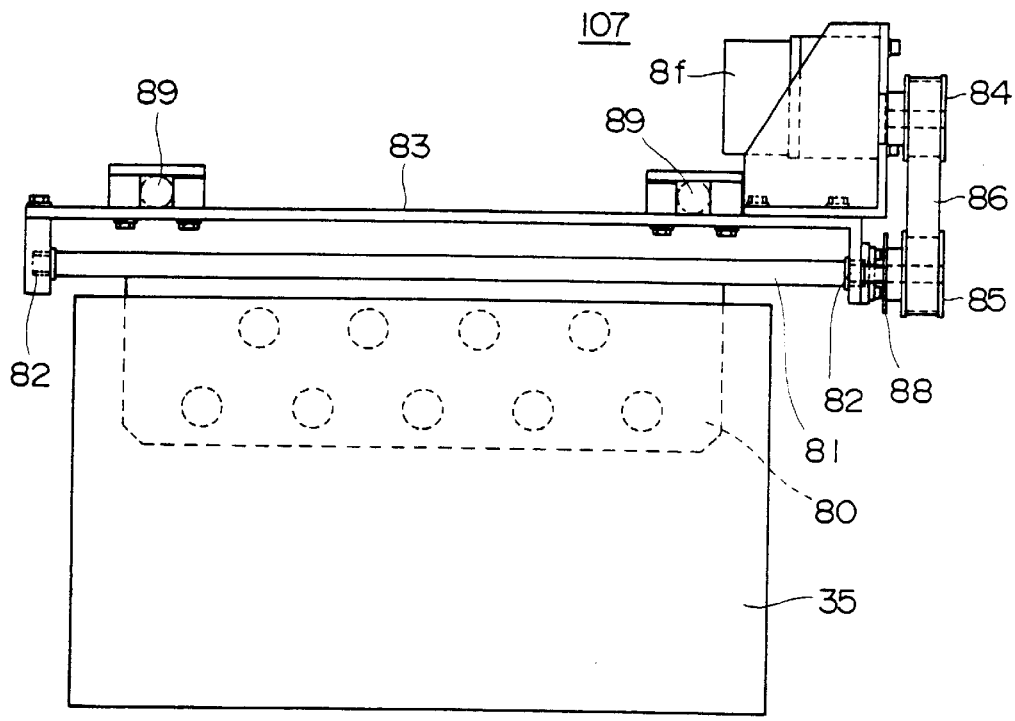
FIGS. 10(a), 10(b) and 10(c) are front, side and plan views respectively of a side holding plate driving arrangement of the boxing system shown in FIG. 1.
Figure 10B:
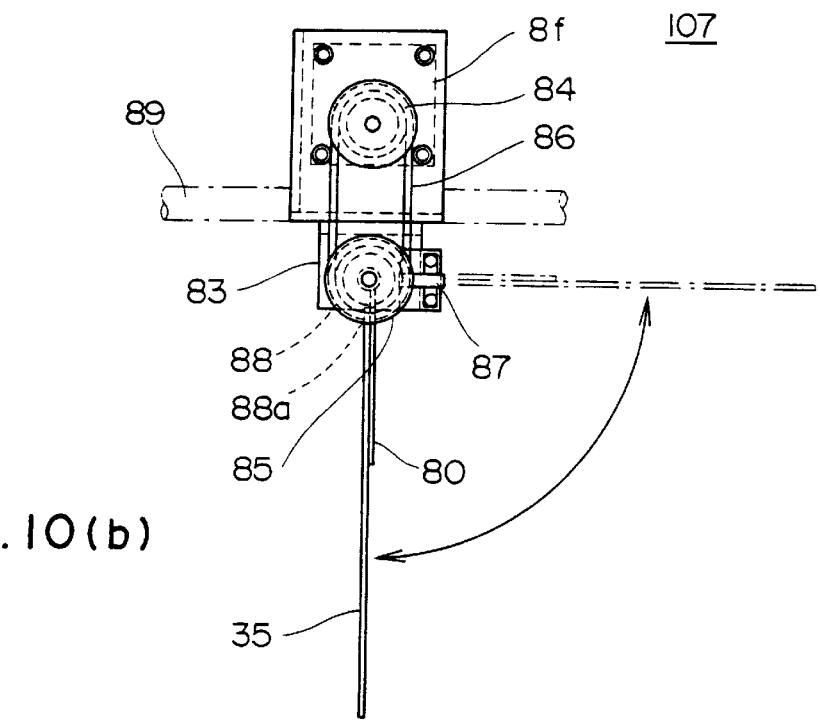

As shown in FIGS. 10(a) and 10(b), the side holding plate driving arrangement 107 operates to hold the lateral sides of the row of aligned packs 1 of which the front and rear end are held by the front and rear holding plates 9-1 and 9-2. The lateral sides are held by the side holding plate 35 and the stop plate 34. The stop plate 34 is secured to the frame 37, and the side holding plate 35 is driven to swing by a sixth stepping motor 8f.

The side holding plate 35 is rectangular in shape and secured to a shaft 81 by a mounting plate 80 as shown in FIG. 10(a). The shaft 81 is rotatably supported by bearings 82 at its opposite ends. The bearings 82 are secured to a base 83. The sixth stepping motor 8f is mounted on the upper surface of the base 83 for swinging the side holding plate 35 about the shaft 81. A driving pulley 84 is mounted on the rotary shaft of the motor 8f, and a follower pulley 85 is fixed to the shaft 81. A timing belt 86 is looped around the drive and follower pulleys 84 and 85.

As shown in FIG. 10(b), a swing position sensor 87 is disposed on the base 83, which senses the original position of the side holding plate 35. The swing position sensor 87 senses a slit 88a in a disc plate 88 fixed to the shaft 81 to sense the original position of the side holding plate 35. The original position of the side holding plate 35 is indicated in phantom in FIG. 10(b), which is substantially a horizontal position. When the side holding plate 35 is driven to swing to the vertical position indicated by solid lines, it can hold, together with the stop plate 34, the lateral sides of packs 1 on the gates 7.

Figure 10C:
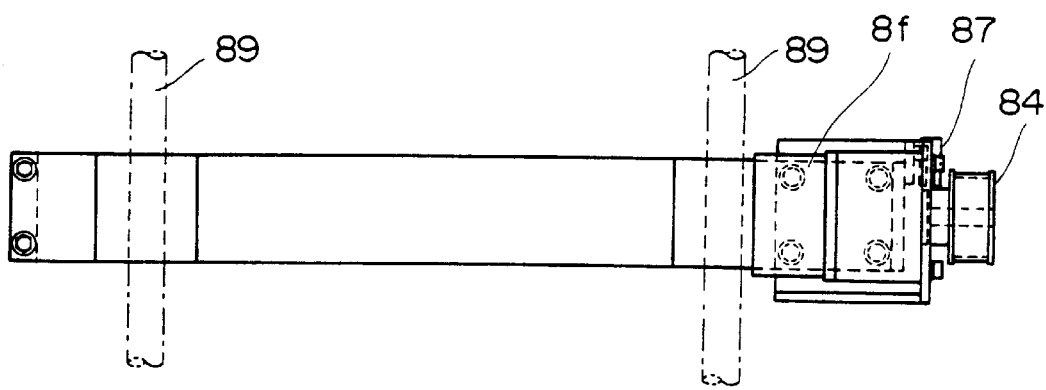

The side holding plate driving arrangement 107 is fixed to the frame 37 by securing the base 83 to rods 89 that are secured to the frame 37 as shown in FIG. 5. FIG. 10(c) is a plan view of the side holding plate driving arrangement 107.

When five packs on the alignment conveyor system 58 are pushed to the gates 7 and aligned on them by the pusher plate 11, the side holding plate 35 in the horizontal position (FIG. 14(e)) is driven to swing to the vertical position (FIG. 14(f)) to thereby laterally hold the sides of the five packs in a row on the gates 7 between the plates 35 and 34. The swinging of the plate 35 to the vertical position can also align the sides of the respective packs 1. After the lateral sides of packs 1 are held by the side holding plate 35 and the stop plate 34, the front and rear ends of the row of the packs 1 are held between the front and rear holding plates 9-1 and 9-2. Thus, packs 1 on the gates 7 can be put into the box 2 without their edges and corners being caught by the flaps 2a and/or upper edges of the sides of the box 2. Thus, packs 1 can be placed neat in the box 2.

With the above-described pack holding arrangement, even when the length of the row of aligned packs 1 is long or the total weight of aligned packs 1 is heavy, packs 1 can be reliably held between the pack holding plates 9-1, 9-2 and 35 and the stop plate 34 with such a small force that will not damage packs 1, so that a number of packs can be reliably and neatly put into the box 2.

Figure 14H:
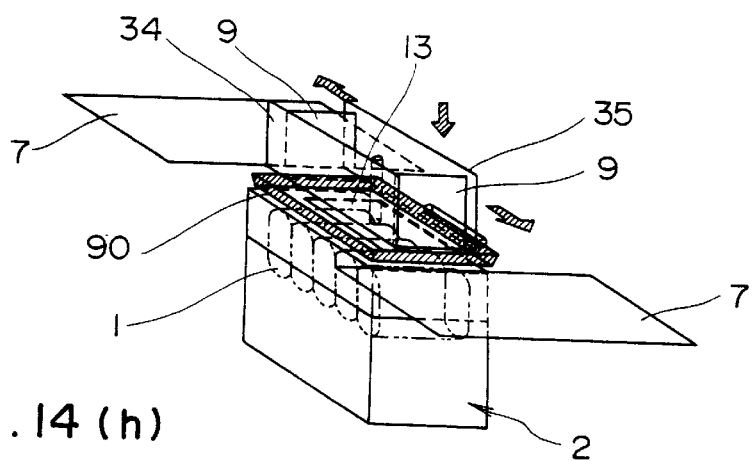
Figure 14I:
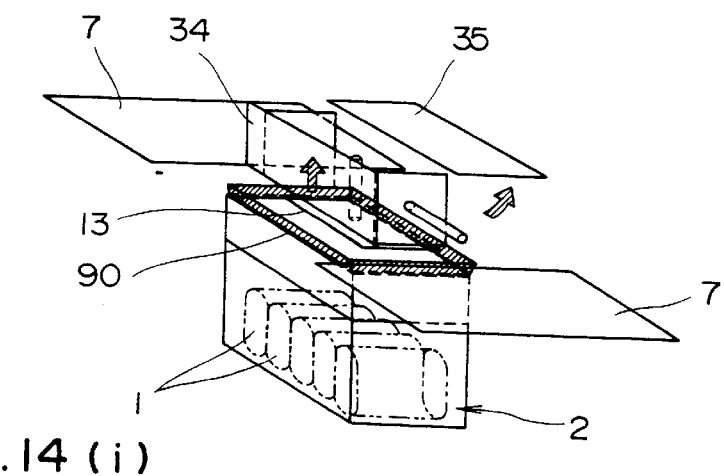
Figure 14J:
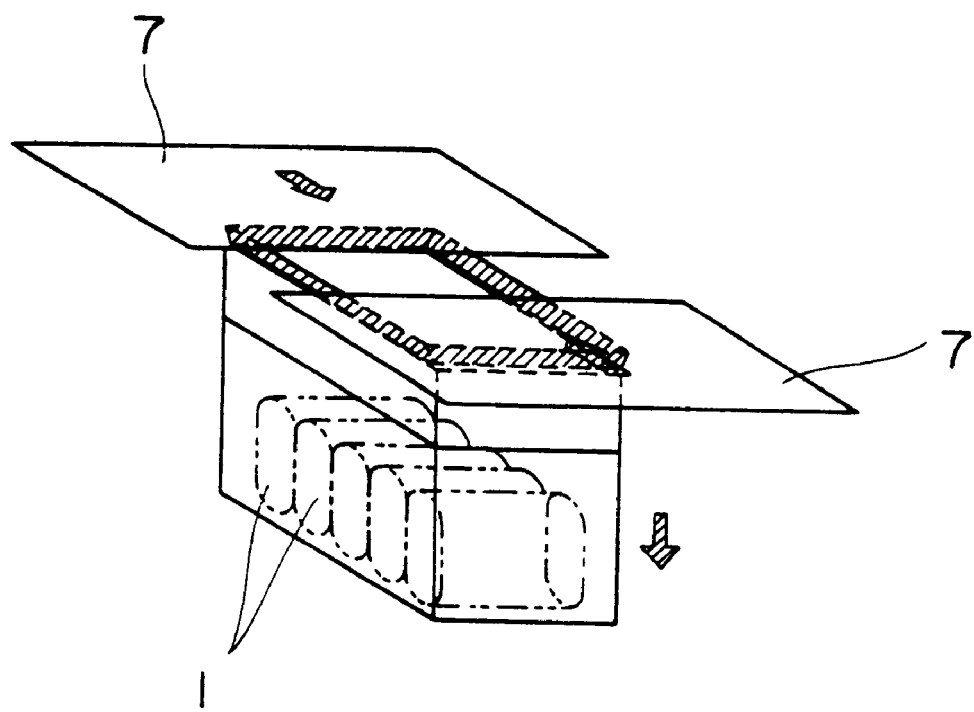

Next, the pack guide 90 shown in FIGS. 14(g)–14(i) is described. The pack guide 90 facilitates the putting of packs 1, held by the holding plates 9-1, 9-2 and 35 and the stop plate 34, into the box 2 by the stuffing plate 13. As shown in FIG. 14(g), the pack guide 90 is disposed horizontally below the gates 7 and above the upper edges of the flaps 2a of the box 2.

Figure 11:
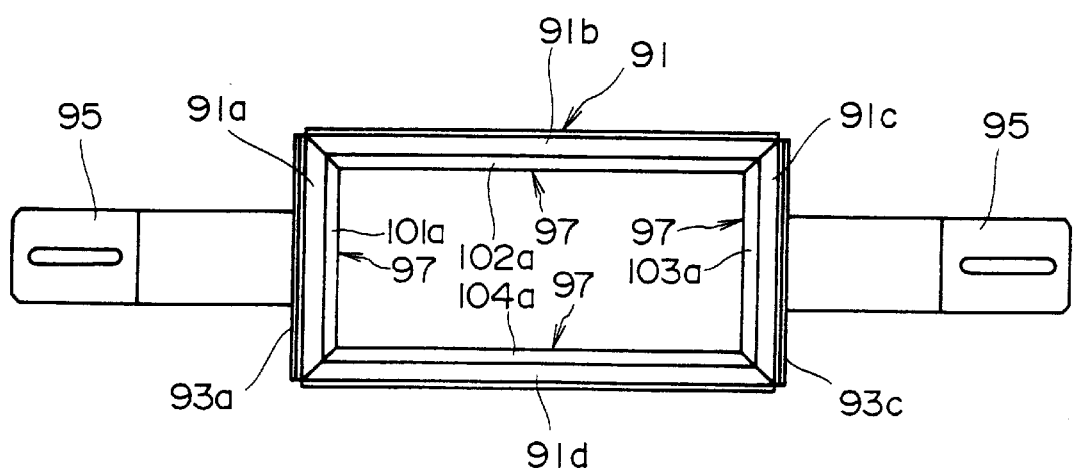
FIG. 11 is a plan view of a guide used in the boxing system of the first embodiment.

The guide 90 is shown in greater detail in FIGS. 11, 12(a) and 12(b). The pack guide 90 includes a guide frame 91, four guide plates 97 and coil springs (not shown) attached to the respective ones of the guide plates 97.

The guide frame 91 is a rigid metal frame and is formed by four trapezoidal planar plates 91a, 91b, 91c and 91d jointed together to form a rectangular funnel as shown in FIG. 11. The guide frame 91 has a rectangular outlet port 92b (FIG. 12(a)) which is substantially the same size as the inlet opening of the box 2, and has a rectangular inlet port 92a larger than the outlet port 92b, which facilitates the putting of the packs 1 held by the holding plates 9-1 and 9-2 into the guide 90.

The four guide plates 97 are hinged by respective shafts 99 and biased by the respective coil springs to assume the innermost positions (FIG. 12(a)) in which they extend diagonally downward from the lower ends of the plates 91a–91d in the planes in which the plates 91a–91d lie. The lower edges of the plates 91a–91d form the outlet port edges 101a–101d of the funnel-shaped guide frame 91. The four guide plates 97 cannot swing inward of the innermost positions, but they can swing outward by about 90°. FIG. 12(b) shows one of the four guide plates 97 pushed outward by packs 1. In this position, the four guide plates 97 press the packs 1 inward. The rectangular outlet port 94 defined by the four guide plates 97 is slightly smaller than the opening of the box 2 so that the upper edges of the four substantially upright flaps 2a of the box 2 can be outside the four guide plates 97, as shown in FIG. 12(a).

As shown in FIGS. 11, 12(a) and 12(b), support plates 93a and 93c are attached to the outer surfaces of the plates 91a and 91c and are provided with mounting members 95, which are used to secure the pack guide 90 to the frame 37.

The aligned packs 1 held by the holding plates 9-1 and 9-2 are pushed into the relatively large inlet port 92a of the pack guide 90 by the stuffing plate 13, as shown in FIG. 13. The stuffing plate 13 pushes the packs 1 further down into the box 2 below the pack guide 90 through the relatively small outlet port 94 of the guide 90. When the packs 1 pass through the outlet port 94, they push the four guide plates 97 outward, as shown in FIG. 12(b), so that the row of the packs 1 are pressed inward by the recovery force of the plates 97 given by the coil springs.

Because of the funnel shape of the pack guide 90, edges, such as heat-sealed portions, and corners of packs 1 do not contact the upper edges of the box 2, and, therefore, packs 1 can be put into the box 2 without leaving empty spaces.

Also, since the guide plates 97 can swing outward or inward to an extent for accommodating various sizes of aligned packs 1, packs 1 of various sizes can be put into a box 2 without being caught by the upper edges of the box 2. This makes it possible to use boxes 2 of smaller sizes than conventionally used ones, which, in turn, makes it possible to use a smaller area for storing the packed boxes 2.

Further, as shown in FIG. 13, the upper edges of the four flaps 2a of the box 2 when it is lifted to a position beneath the guide 90 are pressed outward by being guided along the outer surfaces of the corresponding guide plates 97. Thus, packs 1 do not contact the upper edges of the flaps 2a when they are put into the box and, therefore, are not damaged.

In accordance with programs stored in the memory 28, the controller (CPU) 27 controls the operation of the fourth and fifth stepping motors 8d and 8e which reciprocally move the front and rear holding plates 9-1 and 9-2, and the sixth stepping motor 8f which drives the side holding plate 35 to swing.

The number of packs 1 to be pushed out from the alignment conveyor system 58 can be set through the setting display unit 30 connected to the CPU 27. The setting display unit 30 is also used for setting timing for operating various drivers including the above-described ones as well as quantities of such operations.

The pressing force sensors 70, the swing position sensor 87, and pulse generators 32d, 32e and 32f are also connected to the CPU 27. The pulse generators 32*d*, 32*e* and 32*f* generate pulses to be applied to drivers 39*d*, 39*e* and 39*f*. The stepping motors 8*d*, 8*e* and 8*f* are driven to rotate by the angles as determined by the numbers of pulses supplied to the associated drivers 39*d*, 39*e* and 39*f* from the respective pulse generators 32*d*, 32*e* and 32*f* in accordance with commands from the CPU 27.

The operation of the above-described pack holding arrangement is described with reference to the flow chart shown in FIGS. 17(*a*) and 17(*b*). The processing shown in FIGS. 17(*a*) and 17(*b*) is executed by the CPU 27 in accordance with the programs stored in the memory 28.

First, a predetermined number, five in the illustrated example, of packs 1 are supplied to a set of fins 5 of the alignment conveyor system 58. In Step S200, whether or not the fin set with packs 1 is in the unloading station 19 shown in FIG. 14(*b*) is judged. If it is (i.e. the answer is YES), the pusher plate 11 is driven forward (Step S202), so that the five packs 1 held by the fins 5 are pushed onto the gates 7. Whether the pusher plate 11 has returned to the original position or not is then judged (Step S204), and, if it has returned to the original position, a judgment is made as to whether or not the pusher plate 11 has pushed five packs 1 a predetermined number of times, once in the example illustrated in FIGS. 14(*a*) through 14(*j*) (Step S206).

If two rows of packs 1 are to be put in a box 2, as in the case shown in FIGS. 25(*a*)–25(*d*), the pusher plate 11 operates successively twice in one operating cycle to push out five packs 1 twice.

A judgment is made as to whether or not the pusher plate 11 has been in a predetermined position in the return path to the original position (Step S208). If the pusher plate 11 is in the predetermined intermediate position, the sixth stepping motor 8*f* is driven to move the side holding plate 35 in the horizontal position shown in FIG. 14(*e*) to the vertical position shown in FIG. 14(*f*) (Step S210). Thus, the five packs 1 are aligned on the gates 7 and held between the side holding plate 35 and the stop plate 34.

The side holding plate 35 is moved from the horizontal position to the vertical position after the pusher plate 11 is in the predetermined intermediate position in order to avoid collision of the pusher plate 11 returning to its original position with the side holding plate 35 swinging toward the vertical position.

Then, the fourth and fifth stepping motors 8*d* and 8*e* are driven to move the front and rear holding plates 9-1 and 9-2 by the preset maximum amount X1 (Step S212). Whether the force sensors 70 have been blocked by the shields 76 and generated the representative signal, is judged (Step S214). If the force sensors 70 have generated the respective signals, the fourth and fifth stepping motors 8*d* and 8*e* are stopped to thereby stop the plates 9-1 and 9-2 from being forwarded further (Step S216). Thus, the five packs on the gates 7 are held between the front and rear holding plates 9-1 and 9-2 by an appropriate force.

If the force sensors 70 are judged not to have generated the representative signals, a judgment is made in Step S218 as to whether the fourth and fifth stepping motors 8*d* and 8*e* have operated to forward the the table 66 (FIG. 8(*a*)) by the preset amount X1. If the determination in Step S218 is YES, i.e. if the fourth and fifth stepping motors 8*d* and 8*e* have forwarded the respective holding plates 9-1 and 9-2 by X1, the stepping motors 8*d* and 8*e* and, hence, the holding plates 9-1 and 9-2 are stopped (Step S220). Then, the boxing system is stopped operating, and an alarm signal is generated (Step S222). This situation indicates that the number of packs 1 on the gates 7 is less than the predetermined number, or the total thickness of the packs 1 on the gates 7 has been reduced due to, for example, breakage in one or more packs.

An operator should press an acknowledgment switch on the setting display unit 30 (Step S224), which results in the returning of the side holding plate 35 to the horizontal position (Step S226). The operator then takes steps to place the boxing system in the proper operating condition, by, for example, removing the packs 1 on the gates 7 and placing a predetermined number of new packs 1 between the front and rear holding plates 9-1 and 9-2 on the gates 7 manually or by any appropriate means (Step S228), and press the acknowledgment switch again (Step S230). This causes the side holding plate 35 to swing to the vertical position to hold the new packs 1 on the gates 7 (Step S232).

After Step S216 or Step S232, the gates 7 are opened (Step S234). The stuffing plate 13 is lowered to place the five packs 1 into a box 2 which has been lifted to a position beneath the gates 7, and thereafter, the stuffing plate 13 is raised (Step S236). The side holding plate 35 is returned to the horizontal position, the gates 7 are closed, the front and rear holding plates 9-1 and 9-2 are returned to their respective retracted positions, and the box 2 with packs 1 put therein is lowered and outputted (Step S238). In Step S240, whether or not the pusher plate 11 is in the original position is judged. If the pusher plate 11 is in its original position, the processing returns to Step S200, and the operation described above is repeated.

If it is judged that the pusher plate 11 is not in the original position in Step S240, Step S240 is repeated until the plate 11 returns to its original position, and, then, Step S200 is executed.

A boxing system according to a second embodiment of the present invention is now described with reference to FIGS. 18–24. The boxing system of the second embodiment differs only in an alignment conveyor system from the boxing system of the first embodiment. Therefore, detailed description of the remaining portions will not be given.

Figure 23A:
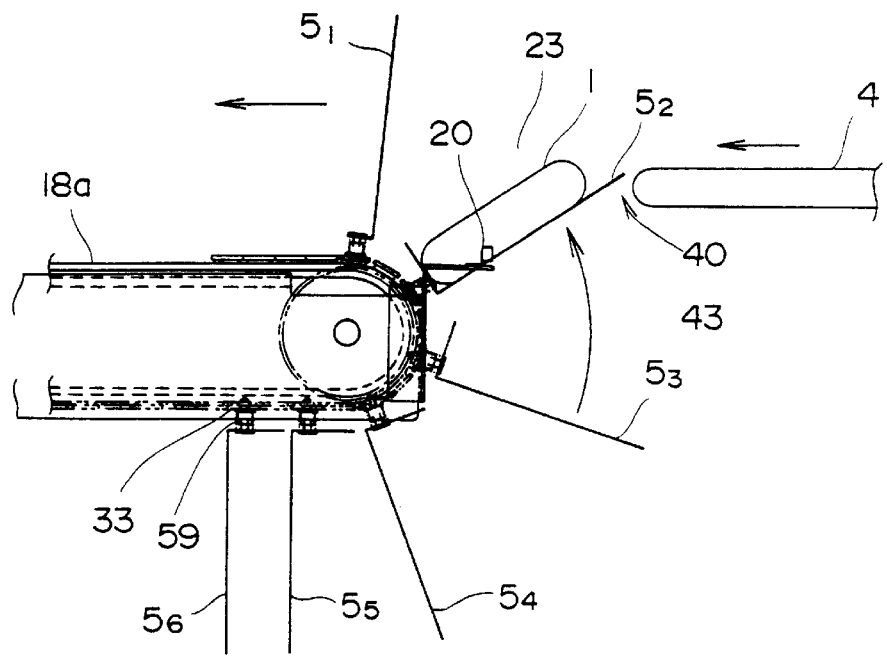
Figure 23B:
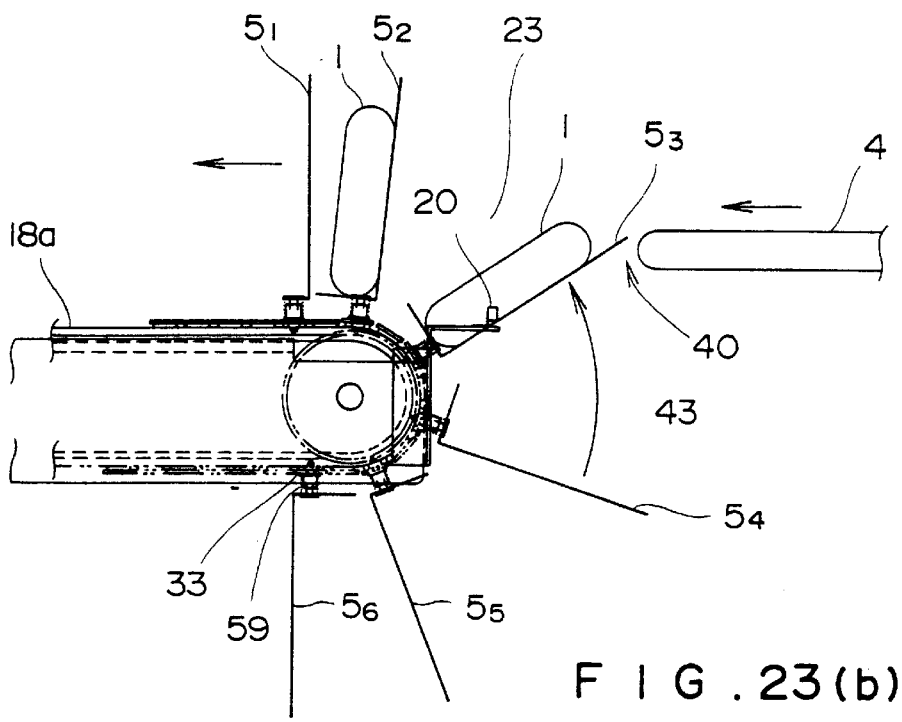
Figure 24:
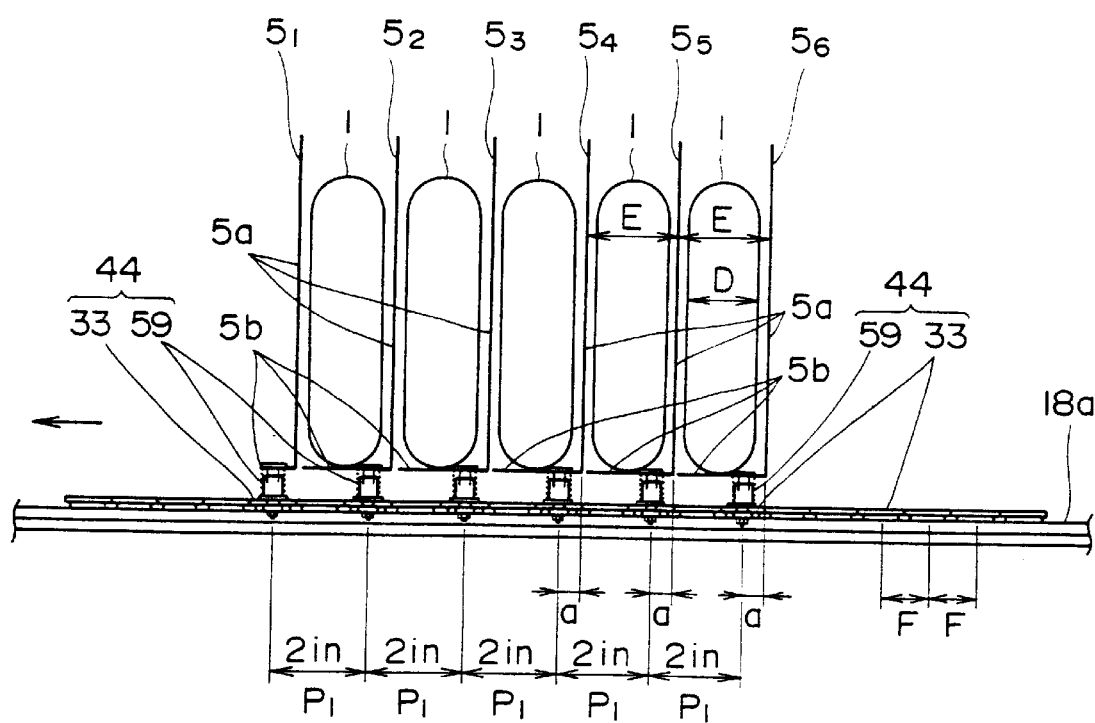
FIG. 24 is a side view of the fins of the first embodiment spaced by 2 inches are in an unloading position.
Figure 25A:
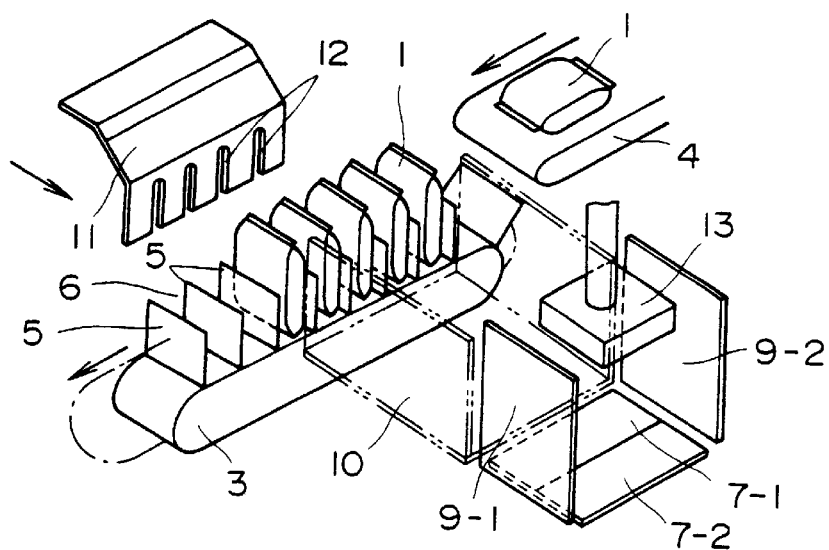
Figure 25B:
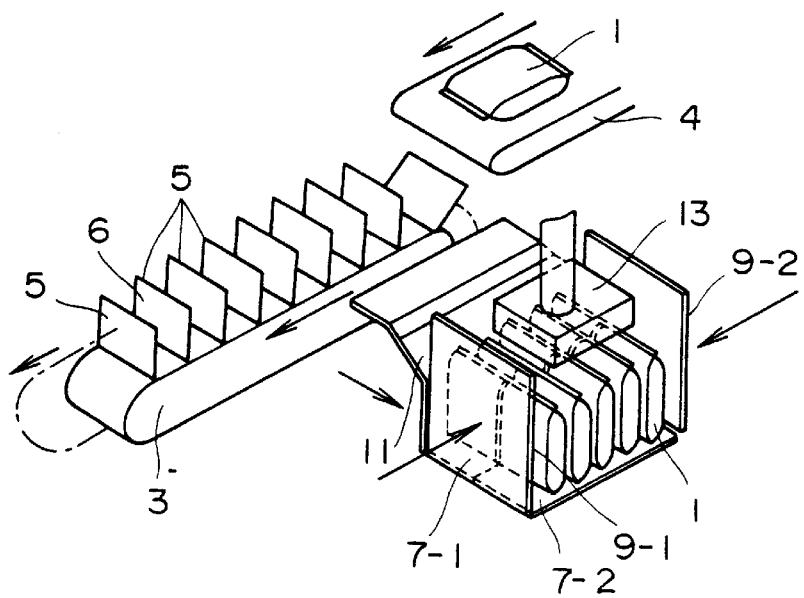
Figure 25C:
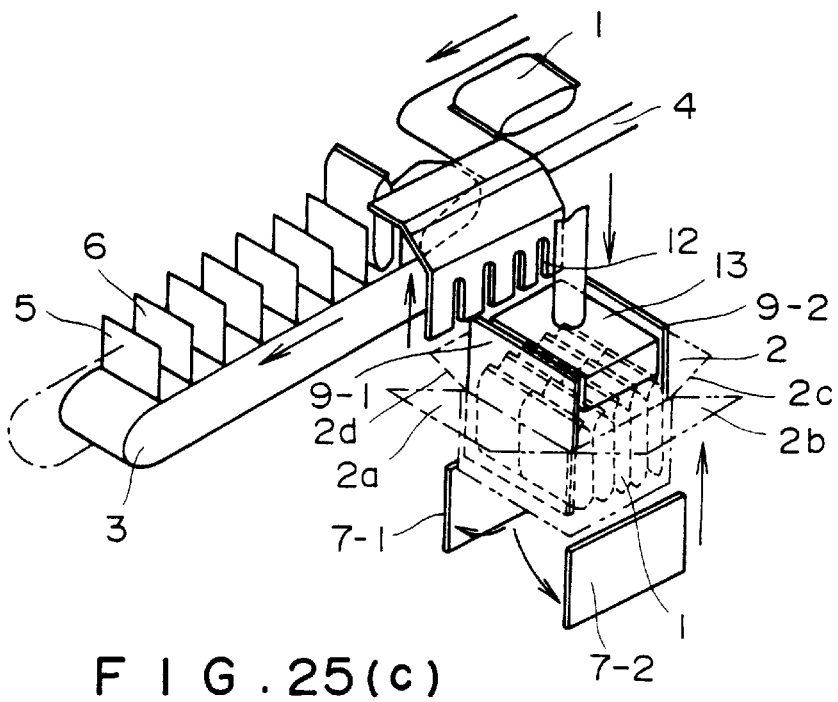
Figure 25D:
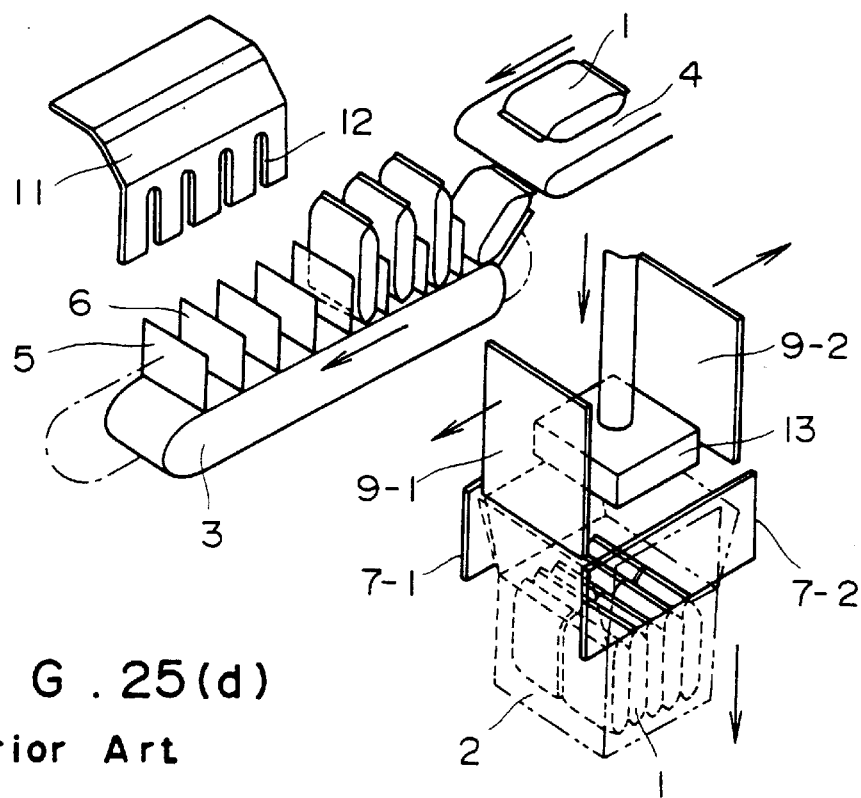

As shown in FIG. 24, the alignment conveyor system 58 according to the first embodiment uses a plurality of fins $5_1$, $5_2$, $5_3$, $5_4$, $5_5$ and $5_6$. Each of the fins $5_1$, $5_2$, $5_3$, $5_4$, $5_5$ and $5_6$ includes the mounting device 59 (FIG. 6(*a*)) secured to the base 5*b* and spaced by a distance "a" from the partition 5*a*. All the fins $5_1$, $5_2$, $5_3$, $5_4$, $5_5$ and $5_6$ have the same distance "a". The fins $5_1$, $5_2$, $5_3$, $5_4$, $5_5$ and $5_6$ are mounted to the respective ones of pairs of fin-mounting fittings 33, which, in turn, are secured to the pairs of chain loops 18*a* and 18*b*, and 21*a* and 21*b*. In FIG. 24, only the chain loop 18*a* is shown. As shown in FIGS. 23(*a*) and 23(*b*), the chain loop pair with the fins $5_1$, $5_2$, $5_3$, $5_4$, $5_5$ and $5_6$ mounted thereto is driven to intermittently move by a fixed pitch $P_1$, which is equal to the distance between adjacent ones of the mounting devices 59. This pitch $P_1$ is equal to an integral multiple of the pitch F of the fin-mounting fittings 33. In the example shown in FIGS. 23(*a*), 23(*b*) and 24, the pitch $P_1$ is equal to two (2) inches. Thus, the adjacent partitions 5*a* are spaced by 2 inches for accommodating a pack 1 having a thickness of more or less smaller than 2 inches. This successively places the tip ends of the fins $5_1$, $5_2$, $5_3$, $5_4$, $5_5$ and $5_6$ in a loading position 40 in the loading station 43 to receive a pack 1 fed from the input conveyor 4.

According to the second embodiment, the alignment conveyor system 58 is so arranged that fins can be mounted not only with the spacing E therebetween being equal to an integral multiple of the pitch F of the fin-mounting fittings 33, but also with the spacing E being equal to a non-integral multiple of the pitch F. The fin spacing is changed in order to accommodate packs of various thicknesses D. For this purpose, the distance E between adjacent fins or partitions which is different from an integral multiple of the pitch F (=1 inch) of the fin-mounting fittings 33 is employed. In the illustrated example, the distance E is 2.5 inches.

The illustrated example is arranged to convey packs 1 having a thickness of, for example, 2.2 inch.

Figure 20:
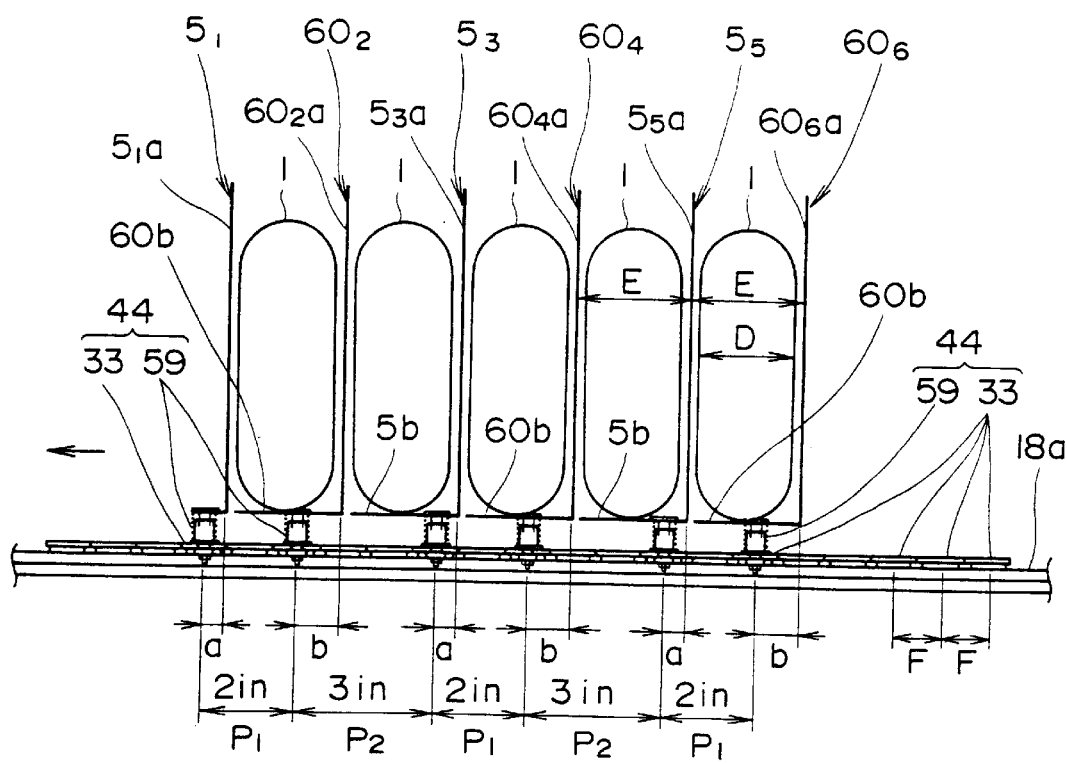
FIG. 20 is a side view of the alignment conveyor system used in the boxing system according to the second embodiment, in which fins spaced by 2.5 inches are in the unloading position.

The illustrated example shown in FIG. 20 uses the first, third and fifth fins $5_1$, $5_3$ and $5_5$ with the mounting device 59 spaced by the distance "a" from the partition 5a and second, fourth and sixth fins $60_2$, $60_4$, and $60_6$ each having a similar mounting device 59 secured to its base 60b and spaced by a different distance "b" from its partition 60a. The different distances "a" and "b" are used because the spacing E between adjacent partitions is not an integral multiple of the pitch F of the fin-mounting fittings 33. Because of different distances "a" and "b" employed between the mounting device 59 and the partition, the distance between adjacent mounting devices 59 are such that the distance between the mounting devices 59 of the first fin 51 and the second fin fins $60_2$ is $P_1$ (=2 inches), the distance between the mounting devices 59 of the second fin fins $60_2$ and the third fin $5_3$ is $P_2$ (=3 inches), the distance between the mounting devices 59 of the third fin $5_3$ and the fourth fin $60_4$ is $P_1$, the distance between the mounting devices 59 of the fourth fin $60_4$ and the fifth fin $5_5$ is $P_2$, and the distance between the mounting devices 59 of the fifth fin $5_5$ and the sixth fin $60_6$ is $P_1$. The values "a" and "b" are determined by the distance E between adjacent partitions (or the thickness of packs), the pitch F of the fin-mounting fittings 33, the radius of curvature of the turning path in the receiving station 43, etc. In the illustrated example, the value "b" is larger than "a" by 0.5 inches.

Figure 21A:
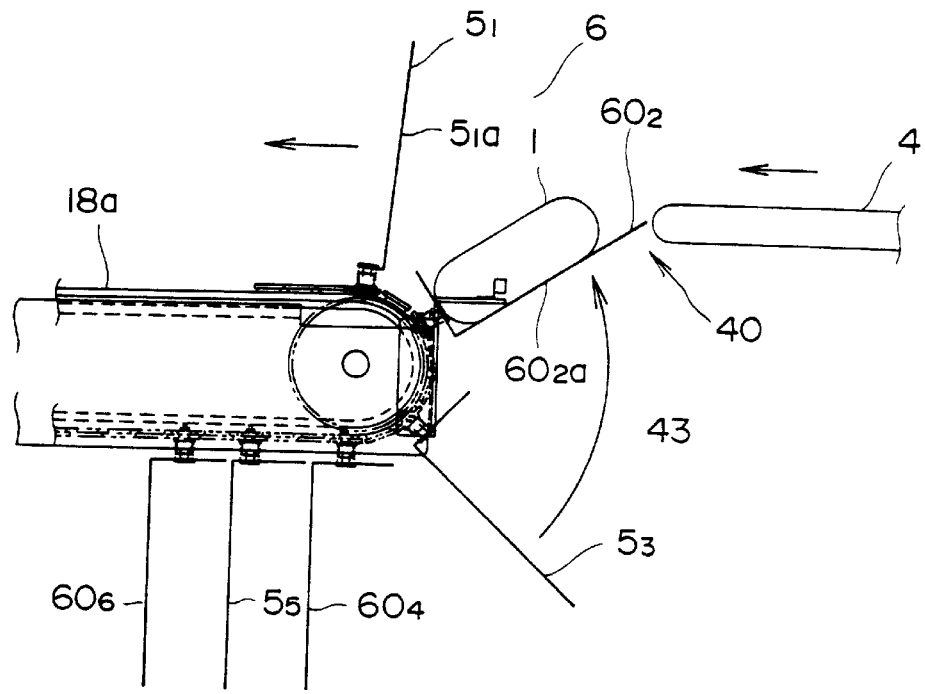
Figure 21B:
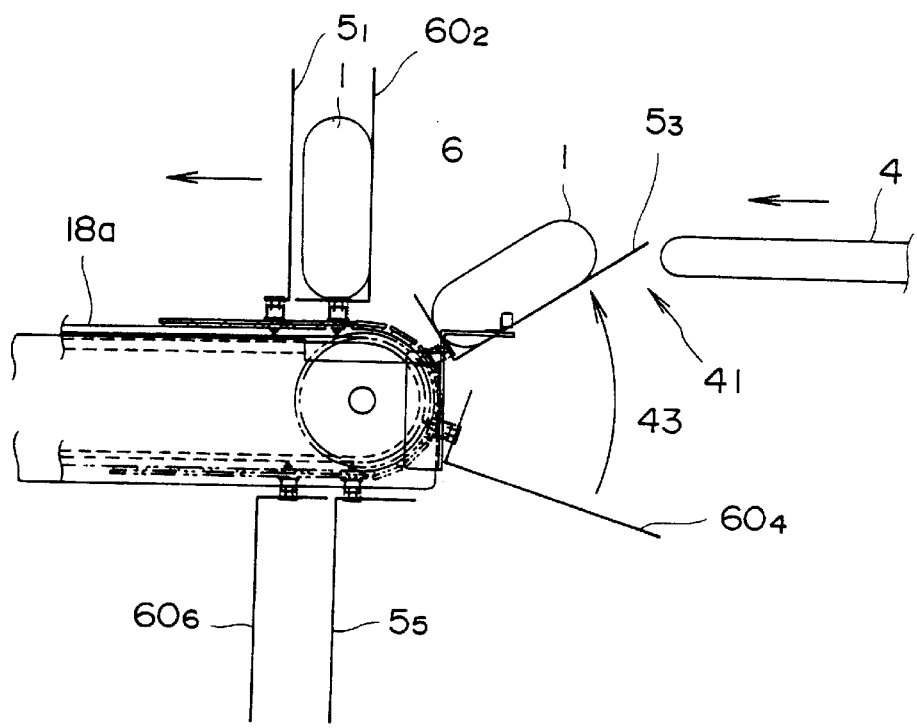

As shown in FIGS. 21(a) and 21(b), after a pack 1 is received on the second fin $60_2$ at the loading position 40, the chain loops are forwarded by the pitch $P_2$. This places the tip end of the third fin $5_3$ at a loading position 41 (FIG. 21(b)) in the loading station 43 so that a next pack 1 can be received on the third fin $5_3$. Then, the chain loops are fed by the pitch $P_1$, which places the tip end of the fourth fin $60_4$ at the loading position 40, so that another pack 1 can be received on the fourth fin $60_4$ from the input conveyor 4. In this way, the pitch by which the respective fins 5 and 60 are moved alternates between $P_2$ and $P_1$. The same procedures are repeated to load the fin set with five packs 1.

The loading positions 41 and 40 in the loading station 43 are such that the tip ends of the fins 5 and 60 can properly receive a pack 1 in a straight position without causing the pack 1 to be bent, as shown in FIGS. 21 (a) and 21(b), and FIGS. 23(a) and 23(b).

Now, the reason why the tip ends of the fins $60_2$, $5_3$, $60_4$, $5_5$ and $60_6$ can be placed properly in the loading positions 40 and 41 is described with reference to FIGS. 21(a), 21(b), 23(a) and 23(b).

The alignment conveyor system 58 and the input conveyor 4 are in such positional relation that, as shown in FIGS. 23(a) and 23(b), the tip ends of the second through sixth fins 5 can be properly placed in the loading position 40 when the distance "a" between the mounting device 59 and the partition 5a is employed for all fins 5 and the pitch by which the chain loops are intermittently moved is an integral multiple of the pitch F of the fin-mounting fittings 33.

FIG. 21(a) illustrates the second fin $60_2$ with its tip end positioned at a loading position 40 in the loading station 43 in the turning path when the first fin $5_1$ is in the position forward by $P_1$ (=2 inches) from the loading position 40. (It is so programmed that the first fin $5_1$ does not stop at the loading position 40 because it is the fin $60_2$ that first receives a pack.)

Since the distance E between the partition $5_1a$ of the fin $5_1$ and the partition $60_2a$ of the fin $60_2$ is 2.5 inches, the chain loops or the fin $5_1$ should have been moved by 2.5 inches, and therefore, the fin $5_1$ should be further moved by a shortage of 0.5 inches. However, since the distance between the mounting device 59 and the partition $60_2a$ of the fin $60_2$ is "b" for adaptation of the mounting device 59 for the fin-mounting fittings 33, the tip end of the fin $60_2$ can be in a position advanced from the position the tip end would assume when the distance "a" is employed, by the difference between "b" and "a", i.e. (b−a)=0.5 inches. In other words, by shifting forward the position of the mounting device 59 of the fin $60_2$ by (b−a), the tip end of the fin $60_2$ in the arcuate turning path is lifted upward to compensate for the shortage of 0.5 inches, so that the tip end can be positioned properly at the loading position 40.

FIG. 21(b) shows the second fin $60_2$ in the position it assumes when the chain loops advance by $P_2$ (=3 inches) from the position where the tip end of the second fin $60_2$ was in the loading position 40. In this state, the tip end of the third fin $5_3$ is at a loading position 41 in the loading station 43, where the chain loops have advanced from the position where the tip end of the first fin $5_1$ is in the loading position 40 by just the twice the distance E between the partitions of adjacent fins, which is an integral multiple (five times) of the pitch F of the fin-mounting fittings 33. The tip end of the third fin $5_3$ can be positioned properly at the loading position 41 because the distance of the partition $5_3a$ and its mounting device 59 is "a".

In the same manner, the tip ends of the fourth and sixth fins $60_4$ and $60_6$ can stop at the loading position 40 shown in FIG. 21(a), and the fifth fin $5_5$ can stop at the loading position 41 shown in FIG. 21(b), where they can properly receive packs 1.

Figure 22A:
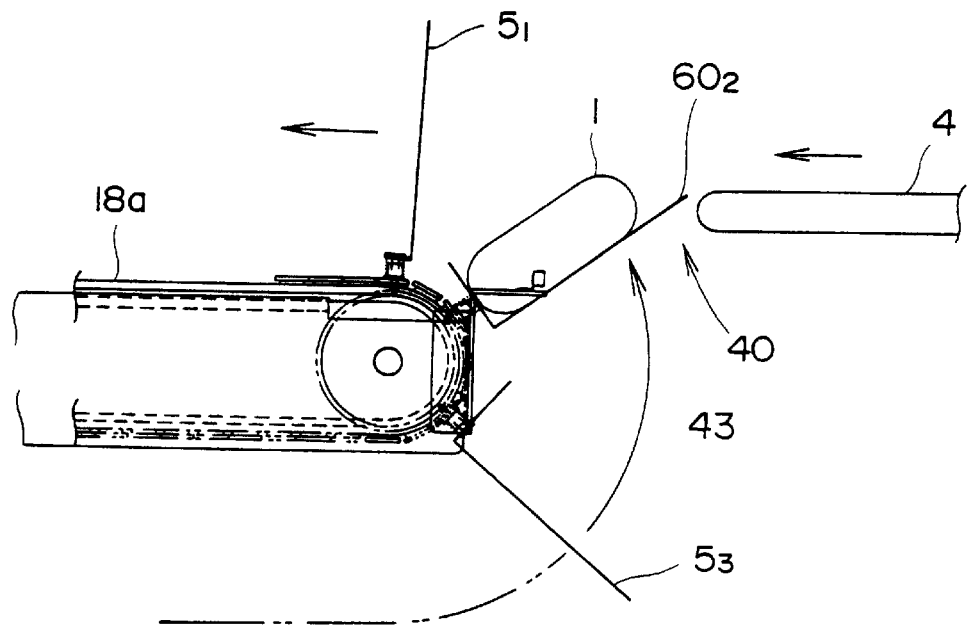
Figure 22B:
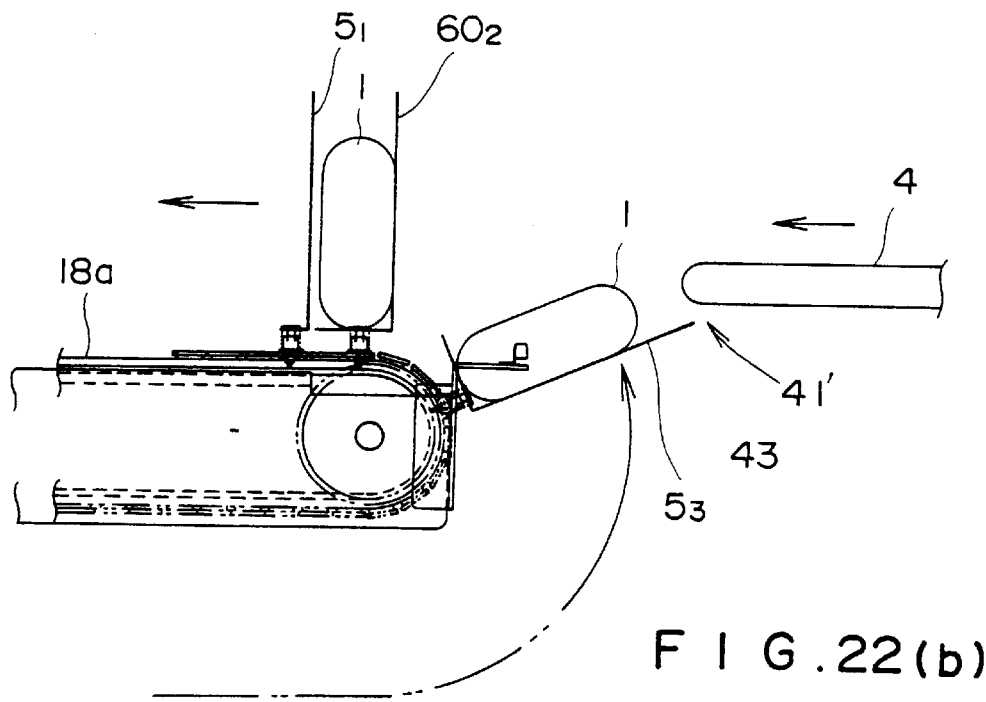

FIGS. 22(a) and 22(b) show the positions where the six fins $5_1$, $60_2$, $5_3$, $60_4$, $5_5$ and $60_6$, which have the distance E between the partitions of 2.5 inches, would assume in the loading station 43 if the chain loops were intermittently moved by 2.5 inches. It should be noted that only three of the six fins, namely, the fins $5_1$, $60_2$, and $5_3$, are shown in FIGS. 22(a) and 22(b) for simplicity of illustration. The tip ends of the third and fifth fins $5_3$ and $5_5$ stop at the loading position 41' shown in FIG. 22(b), and the tip ends of the second, fourth and sixth fins $60_2$, $60_4$ and $60_6$ stop at the loading position 40 shown in FIG. 22(a). The first fin $5_1$ passes both loading positions as in the case illustrated in FIGS. 21(a) and 21(b).

If the system is so arranged that the tip ends of the even-numbered fins $60_2$, $60_4$ and $60_6$ are placed at the substantially appropriate loading position 40 as shown in FIG. 22(a), the tip ends of the odd-numbered fins $5_3$ and $5_5$ stops at the position 41' shown in FIG. 22(b), which is lower by a relatively large distance than the output end of the input conveyor 4. At such loading position 41', packs 1 fed by the input conveyor 4 cannot be properly received on the fins $5_3$ and $5_5$, but they may be bent before they are received on the fins $5_3$ and $5_5$.

As is understood from the above description, if the chain loops are moved by a step of 2.5 inches even when the distance E between adjacent partitions of fins is 2.5 inches, packs 1 cannot properly be received on the respective fins, as shown in FIGS. 22(a) and 22(b). Accordingly, the amount by which the chain loops 18a and 18b, and the chain loops 21a and 21b are moved intermittently must be varied in accordance with the distance between adjacent ones of the mounting devices 59.

Although only one fin set has been described with reference to FIGS. 20 through 24, the same is applicable to the remaining fin set.

According to the second embodiment, the fins of each set are mounted to the chain loops with the distance E between adjacent partitions determined in accordance with the thickness D of packs 1 (FIG. 20). For example, when the thickness of the packs 1 is about 2.2 inches, the fins 5 and 60 are alternately mounted to the fin-mounting fittings 33 with the distance E set to 2.5 inches. In this case, a value of 2.5 is set through the setting display unit 30, which is coupled to the CPU 27. By this setting, the first and second sets of fins 5 and 60 of the first and second groups can be advanced intermittently so as to properly receive packs 1 successively from the input conveyor 4, as illustrated in FIGS. 21(a) and 21(b).

In the example shown in FIG. 24, the thickness D of the packs 1 is about 1.7 inches, and the fins 5 are mounted to the fittings 33 with the distance E of 2.0 inches. In this case, a value of 2.0 is set through the setting display unit 30, so that the chain loops are moved intermittently to properly receive packs having the thickness D of about 1.7 inches successively fed from the input conveyor 4, as shown in FIGS. 23(a) and 23(b).

Figure 18:
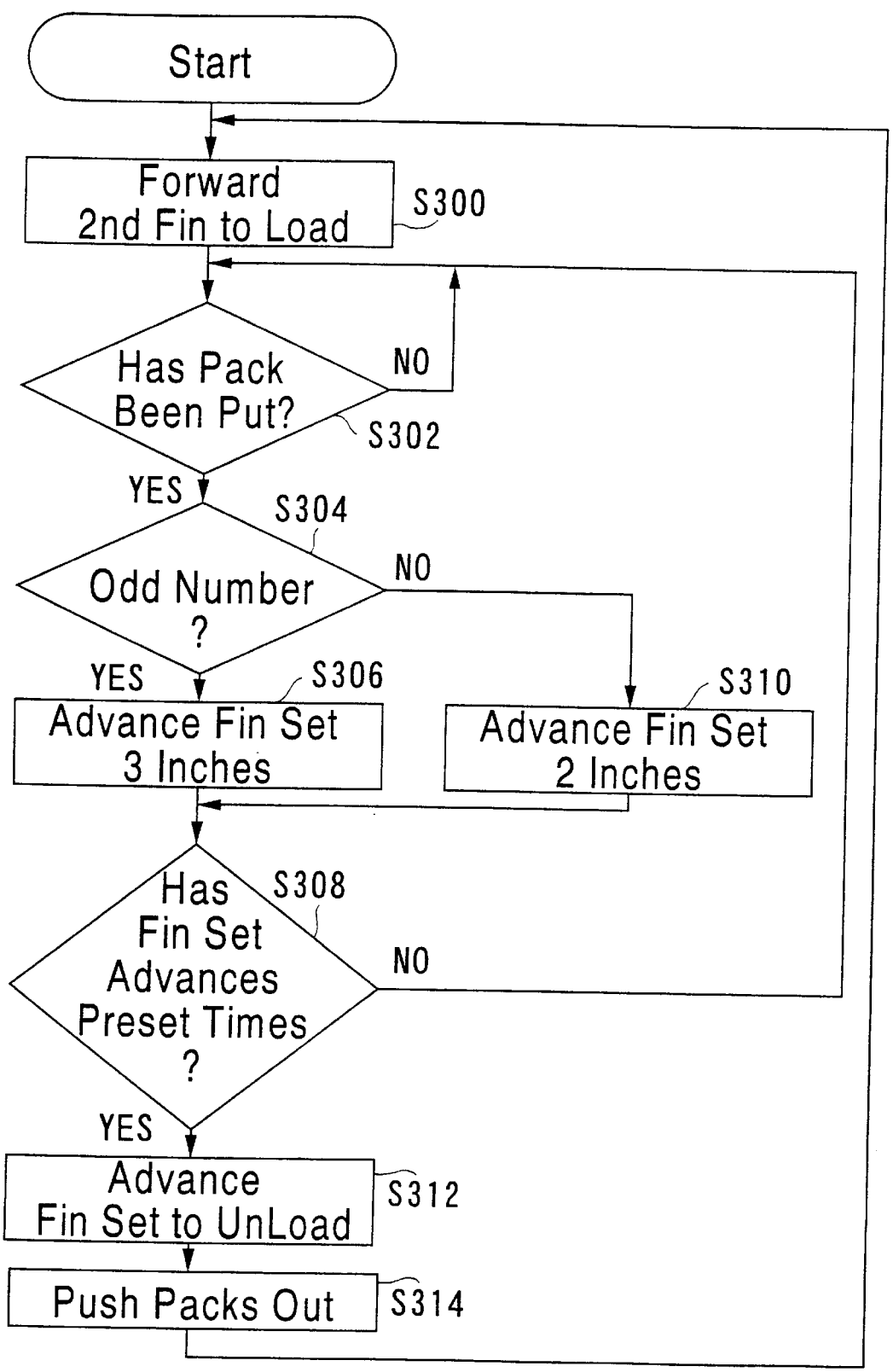
FIG. 18 is a flow chart illustrating the operation of an alignment conveyor system used in a boxing system according to a second embodiment of the present invention, in which fins are mounted on the alignment conveyor system with the spacing of 2.5 inches disposed between adjacent fins.

Now, the operation of the alignment conveyor system 58 according to the second embodiment is described with reference to the flow chart shown in FIG. 18. The flow chart is for the system in which the thickness D of packs 1 is about 2.2 inches, a set of fins mounted to the fin-mounting fittings 33 include six fins $5_1$, $60_2$, $5_3$, $60_4$, $5_5$ and $60_6$ (FIG. 20), and two such fin sets are mounted to the fin-mounting fittings 33 of each of the chain loop pair 18a, 18b and the chain loop pair 21a, 21b. The operation of the conveyor system 5 can be achieved by setting a value of 2.5 through the setting display unit 30. Thus, the distance E between the partitions 5a and 60a of adjacent fins 5 and 60, which is equal to 2.5 inches, is 2.5 times the pitch F (=1 inch) of the fin-mounting fittings 33.

First, the controller (CPU) 27 causes the second fin $60_2$, in one of the two fin sets of a predetermined one of the first and second fin groups to advance to the loading position 40 in the loading station 43 as shown in FIG. 21(a) (Step S300). Then, the CPU 27 makes a judgment as to whether a pack 1 has been put into the space 6 formed between the partitions $5_1a$ and $60_2a$ of the fins $5_1$ and $60_2$ (Step S302). If a pack 1 has been received, it is judged whether that fin set has been stopped in the loading station 43 an odd number of times (Step S304). Since it is the first time, i.e. or an odd-numbered time, that that fin set has stopped in the loading station 43, the associated chain loop pair 18a, 18b, for example, are advanced by three inches by appropriately activating the associated stepping motor 8a. It places the tip end of the third fin $5_3$ in the loading position 41 as shown in FIG. 21(b) (Step S306). Next, a judgment is made as to whether that fin set has stopped a predetermined number, five in the illustrated embodiment, in the loading station 43 (Step S308). In other words, the CPU 27 makes a judgement as to whether a predetermined number, five in the illustrated example, of packs 1 have been put into the respective spaces 6 formed between adjacent fins $5_1$, $60_2$, $5_3$, $60_4$, $5_5$ and $60_6$. Since it is the second time that that fin set has stopped when the tip end of the third fin $5_3$ has been brought to the loading position 41, the process returns to Step S302, and Steps S302 and S304 are repeated. This time, however, the answer to the query made in Step S304 is NO, the associated stepping motor 8a is driven to advance the chain loops 18a and 18b by two inches (Step S310), which causes the tip end of the fourth fin $60_4$ to be placed in the loading position 40 shown in FIG. 21(a). After that, the CPU 27 makes a judgment as to whether that fin set has stopped five times in the loading station 43, i.e. whether five packs 1 have been put into the respective ones of the five spaces 6 (Step S308). Steps S302, S304 and S306 or S310 are repeated if the answer to the query made in Step S308 is NO. When that fin set has stopped the fifth time in the loading station 43, and all of the five spaces 6 have been loaded with packs 1, the answer to the judgment made in Step S308 becomes YES, that set of fins $5_1$, $60_2$, $5_3$, $60_4$, $5_5$ and $60_6$ is forwarded to the unloading station 19 (Step S312). Thereafter, the five packs 1 held in the spaces 6 between adjacent ones of the six fins are pushed out of the chain loops 18a and 18b of the alignment conveyor system 58 by the pusher plate 11, and that fin set is forward to the next position (Step S314).

After that, the next fin set is forward to the loading station 43 until the tip end of the second fin $60_2$ is in the loading position 40 shown in FIG. 21(a), and the same processing as described above is repeated.

The forwarding of each fin set is controlled in such a manner that it does not interfere or contact with the preceding one.

Figure 19:
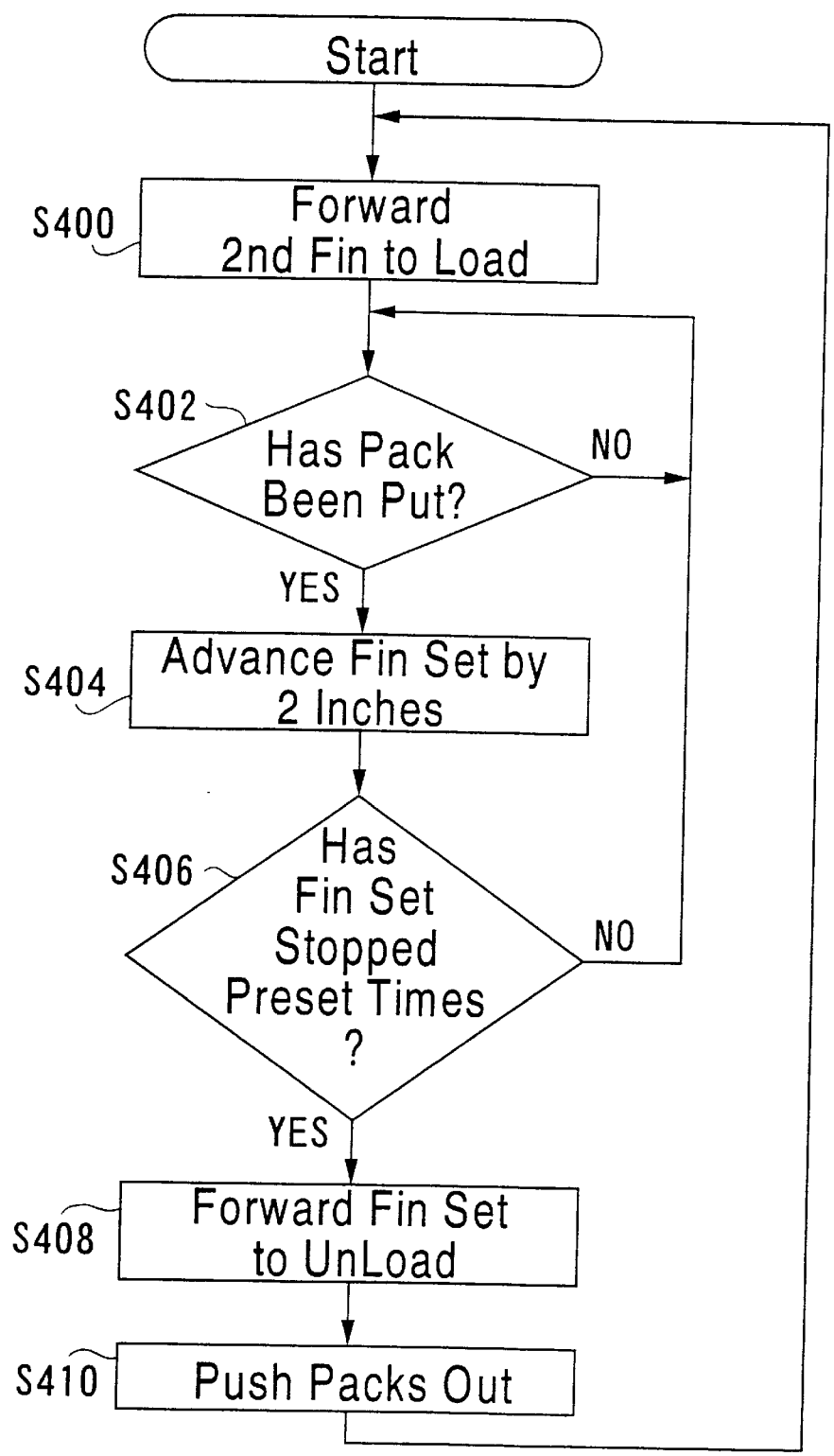
FIG. 19 is a flow chart illustrating the operation of the alignment conveyor system used in the boxing system according to the second embodiment of the present invention, in which fins are mounted on the alignment conveyor system with the spacing of 2 inches disposed between adjacent fins.

Now, the operation of the alignment conveyor 58 is described with reference to the flow chart shown in FIG. 19. The flow chart shown in FIG. 19 is for explaining the operation of the conveyor system 58 shown in FIG. 24, in which the thickness D of each pack 1 is about 1.7 inches and two fin sets each including six fins $5_1$, $5_2$, $5_3$, $5_4$, $5_5$ and $5_6$ mounted to the fin-mounting fittings 33 mounted to each of the chain loop pairs 18a and 18b and 21a and 21b. The operation can be achieved by setting a value of "2.0" through the setting display unit 30. The distance E between partitions 5a of adjacent ones of the six fins 5 is equal to 2 inches, which is twice the pitch F (=1 inch) of the fin-mounting fittings 33 attached to the chain loops 18a, 18b and 21a, 21b.

First, the controller (CPU) 27 causes one of two sets in one of the four groups of fins to be brought into the loading station 43, where the tip end of the second fin $5_2$ is placed in the loading position 40 as shown in FIG. 23(a) (Step S400). Whether a pack 1 is put into the spacing 6 between the first and second fins $5_1$ and $5_2$ is judged by the CPU 27 (Step S402). If the space 6 is loaded with a pack 1, the associated chain loop pair 18a and 18b, for example, is advanced by two (2) inches by driving the associated stepping motor 8a, so that the tip end of the third fin $5_3$ is brought in the loading position 40 as shown in FIG. 23(b) (Step S404). Then, a judgment is made as to whether that fin set has been stopped in the loading station 43 a predetermined number, five in the illustrated example, of times (Step S406). Since it is the second stop of that fin set that the tip end of the third fin $5_3$ stops, which is less than the predetermined number of times, the processing in the respective Steps S402–S406 is repeated. When the fin set has stopped five times in the loading station 43 so that five packs 1 have been put into the respective spaces 6, the fin set is forwarded to the unloading station 19 (Step S408). Then, the pusher plates 11 pushes out the five packs 1 in the five spaces 6 out of the alignment conveyor system 58, and the fin set is forwarded to the next position (Step S410). After that, the tip end of the second fin $5_2$ of the next fin set which belongs to the other fin group is brought to the loading station 40 shown in FIG. 23(a), and the processing in Steps S400–S410 is executed in the manner as described above.

As described above, the amount by which the chain loop pair is forwarded in one step of the intermittent forwarding of the alignment conveyor system 58 according to the second embodiment depends on whether the distance E between the partitions of adjacent fins is an integral multiple (e.g. 1, 2, 3, . . . ) or a multiple with a decimal (e.g. 1.1, 1.2, 1.3, . . . ) of the pitch F of the fin-mounting fittings 33 on the chain loop pair 18a and 18b and 21a and 21b.

If, as shown in FIG. 20, the thickness D (e.g. 2.2 inches) of the packs 1 to be handled is slightly less than a predetermined multiple (e.g. 2.5), which is greater than one and has a decimal portion, of the pitch F (e.g. 1 inch) of the fin-mounting fittings 33, the distance E between adjacent partitions of, for example, the fins $5_1$ and $60_2$, can be the predetermined multiple, i.e. 2.5 times the pitch F of the fittings 33. Accordingly, it is necessary to alternately mount to the fin-mounting fittings 33, a plurality, two in this case, of different types of fins 5 and 60 having the distances "a" and "b", respectively, between the mounting device 59 and the partitions 5a and 60a. In this case, the mounting devices 59 of the first and second fins are spaced by the distance $P_1$, the mounting devices 59 of the second and third fins are spaced by the distance $P_2$, and the mounting devices 59 of the third and fourth fins are spaced by the distance $P_1$. In this manner, the distance between the adjacent mounting devices 59 alternates between $P_1$ and $P_2$. The chain loop pair is then advances intermittently by $P_1$ and $P_2$, alternately. This makes the tip ends of the fins 60 and 5 be placed in the respective loading positions 40 and 41 in the turning path, where packs 1 can be properly received in the respective pack receiving spaces 6.

The thickness D (e.g. 1.7 inches) of packs 1 to be handled may be slightly less than a multiple (e.g. two) of the pitch F (e.g. 1 inch) of the fin-mounting fittings 33, as in the case shown in FIG. 24. In this case, the distance E between adjacent partitions 5a of the respective fins $5_1$–$5_6$ can be an integral multiple (e.g. two) of the pitch F of the fin-mounting fittings 33. Accordingly, it is possible to use a plurality, e.g. six in the illustrated example, of fins of the same structure with the distance "a" between the mounting device 59 and the partition 5a. Thus, the mounting devices 59 of the fins $5_1$, $5_2$, $5_3$, $5_4$, $5_5$ and $5_6$ can be mounted to the respective fittings 33 with the same pitch (e.g. 2F). In this case, the fin set is advanced stepwise by a fixed pitch (=2F=2 inches in the illustrated embodiment), and the tip ends of the respective fins $5_2$, $5_3$, $5_4$, $5_5$ and $5_6$ can be placed properly in the loading position 40 in the turning path shown in FIGS. 23(a) and 23(b).

As described above, according to the second embodiment, independent of the mounting pitch F of the fin-mounting fittings 33, the tip ends of the fins can be placed in the loading position in the loading station appropriate for receiving a pack 1, by using either fins 5 or fins 5 and 60, dependent on the thickness of the packs 1 to be handled, and advancing the fins by a predetermined fixed amount as shown in FIGS. 23(a), 23(b) and 24, or alternately by predetermined different pitches (e.g. 2F and 3F) as shown in FIGS. 20, 21(a) and 21(b). With this arrangement, as shown in FIGS. 20 and 24, packs 1 can be held adjacent to each other and conveyed, and they can be pushed out from the alignment conveyor system 58 onto the gates 7, without being bent since packs 1 can be held with little gap between adjacent ones. Then, the front and rear holding plates 9-1 and 9-2 can hold, without fail, the packs 1 which are closely spaced and erected on the gates 7, and can put them into the box 2.

As described above, packs having a thickness less than an integer, one or greater, plus 0.5 times the pitch of the fin-mounting fittings 33 can be handled by using only two types of fins, e.g. fins 5 and 60, having different distances between the mounting devices 59 and the partitions. Thus, the number of types of fins to be prepared can be small, two in the illustrated examples, and, therefore, the manufacturing of the fins is easy. Also, the number of the types of fins to be stocked can be small.

The length of the bases 5b (60b) on which packs are placed should be slightly less than the distance E between adjacent partitions 5a (60a).

In the above-described embodiments, the number of fins used is six, but a different number of fins may be used to convey a different number of packs in a time.

Also, the system of the present invention can put two or more rows of packs in a box 2, as in the prior art shown in FIGS. 25(a) through 25(d). Also, a row or rows of packs may be stacked in a box 2. For these and other modifications, the shape of the pusher plate 11, the shape and distance of the front and rear plates 9-1 and 9-2, the timing of the lowering and lifting the stuffing plate 13, etc. may have to be modified, but such modifications are within the scope of the invention.

In the described embodiments, packs 1 are supplied to the alignment conveyor system 58 one by one in a row. Although not shown, however, two or more packs 1 may be fed side by side from the input conveyor 4 into each of the pack receiving spaces 6 on the alignment conveyor system 58. In such a case, packs are pushed out from the alignment conveyor system 58 in two or more rows onto the gates 7. In this case, too, the shape of the pusher plate 11, the shape of the front and rear plates 9-1 and 9-2, the timing of the lowering and lifting the stuffing plate 13 etc. may have to be modified, but such modifications are within the scope of the invention.

Packs 1 can be put in a box 2 with one lateral side down.

In the described embodiments, each of the first and second groups of fins includes two sets of fins, but it may include only one set.

The controller (CPU) 27 may be arranged to control the system in such a manner that when one fin set of one of the first and second fin groups is in the unloading station 19, one fin set of the other fin group loaded with a predetermined number of packs 1 can stand by for the unloading immediately before the unloading station 19, which results in improvement of the boxing efficiency of the boxing system.

The force sensors 70 may have a structure shown in FIGS. 9(a) and 9(b), instead of the structure shown in FIGS. 8(a) and 8(b). FIGS. 9(a) and 9(b) are front and side views of one of the force sensors 70. This alternative structure includes a load cell 100 for detecting the magnitude of the force with which the associated holding plate 9 presses the row of packs 1 and generating a magnitude-representative signal. The load cell 100 is coupled between the sliding shaft 74 and the holding plate 9. The holding plate 9 is driven by the holding plate linear driver 63 to forward to continuously press the end pack 1. The controller 27 stops the driving of the holding plate linear driver 63 in response to the magnitude representative signal the load cell 100 generates when the holding plate 9 presses the pack 1 with a preset force. In place of the load cell 100, a piezoelectric device may be used. Alternatively, a pressure sensor may be used in place of the load cell 100, together with a piston and a cylinder filled with a fluid. One of the piston and the cylinder is coupled to the sliding shaft 74 and the other to the holding plate 9. The pressure sensor is connected in such a manner as to be able to sense the pressure applied to the fluid.

The fins used in the described embodiments are the fins 5-1, 5-2, 5'-1 and 5'-2 for one inch for the distance E between adjacent partitions of 1 inch (FIGS. 1 and 2), the fins 5 for two inches for E of two inches (FIG. 24), and the fins 5 and 60 for 2.5 inches for E of 2.5 inches (FIG. 20), but fins for 3, 4, 1.3 or 2.8 inches, for example, may be used for the distance E of 3, 4, 1.3 or 2.8 inches may be used instead for receiving, from the input conveyor 4, packs 1 having a corresponding thickness. In this case, the amount of intermittent movement of the fins in the standby position before the loading station 43 to place them in the loading station is set to a value equal to or approximately equal to the distance between the mounting device 59 of the fin in the loading station and the mounting device 59 of the immediately succeeding fin.

Further, in the described embodiments, one or more of fin sets are put in a standby position before the loading station or the unloading station. However, the present invention can be also applicable to an alignment conveyor system in which fin sets do not stand by for the unloading or loading before the unloading or loading station.

The above-described arrangement, in which fins with a variable spacing between adjacent mounting devices 59 with the fins intermittently forwarded with a corresponding variable pitch, can be also applied to a conveying system having only one chain conveyor.

As various changes could be made in the above without departing from the scope of the invention, it is intended that all matter contained in the above description and shown in the accompanying drawings shall be interpreted as illustrative and not in a limiting sense.

What is claimed is:

1. A boxing system including an article holding arrangement including holding members for holding a predetermined number of aligned articles to be put in a box, said holding arrangement comprising:

a driving unit for moving said holding members toward and away from each other along a direction in which said articles are aligned, said holding members being engageable with at least some of said articles to press said aligned articles together;

a force detecting unit for detecting forces with which said holding members press said aligned articles together when said holding members are driven toward each other; and means for stopping said driving unit from driving said holding members when the forces applied to said holding members as detected by said force detecting unit is greater than a predetermined value.

2. A boxing system as set forth in claim 1 wherein said driving unit includes at least one linearly movable member connected to a holding member, and a motor for actuating said movable member.

3. A boxing system as set forth in claim 1 wherein said means for stopping said driving unit comprises a CPU of a control unit.

4. A boxing system as set forth in claim 1 further comprising a funnel-shaped guide into which said aligned articles held by said holding members are forced to thereby put said aligned articles into said box, the funnel-shaped guide having an outlet port positionable at said box.

5. A boxing system as set forth in claim 4 wherein said outlet port of said funnel-shaped guide comprises guide members which can be pushed outward from an original position by said articles passing through said outlet port.

6. A boxing system as set forth in claim 5 wherein said guide members return to said original position when said articles have passed through said outlet port.

7. A boxing system as set forth in claim 4 wherein said outlet port of the funnel-shaped guide is rectangular.

8. A boxing system as set forth in claim 4 wherein said funnel-shaped guide has an inlet port for receiving said aligned articles.

9. A boxing system as set forth in claim 8 wherein said inlet port is rectangular.

10. A boxing system as set forth in claim 4 further comprising a movable pushing device for pushing said aligned articles from a position held by said holding members through the funnel-shaped guide and into said box.

11. A boxing system comprising:

front and rear holding members for holding a predetermined number of aligned articles to be put in a box, at least one of said front and rear holding members being controllably movable while holding said aligned articles and configured to apply force to said aligned articles in the direction of alignment; and side holding members for holding said aligned articles held by said front and rear holding members, at least one of said side holding members being controllably movable while holding said aligned articles and configured to apply force to said aligned articles in the direction perpendicular to said direction of alignment.

12. A boxing system as set forth in claim 11 further comprising a funnel-shaped guide into which said aligned articles held by said holding members are forced to thereby put said aligned articles into said box, the funnel-shaped guide having an outlet port positionable at said box.

13. A boxing system as set forth in claim 12 wherein said outlet port of said funnel-shaped guide comprises guide members which can be pushed outward from an original position by said articles passing through said outlet port.

14. A boxing system as set forth in claim 13 wherein said guide members return to said original position when said articles have passed through said outlet port.

15. A boxing system as set forth in claim 12 wherein said outlet port of the funnel-shaped guide is rectangular.

16. A boxing system as set forth in claim 12 wherein said funnel-shaped guide has an inlet port for receiving said aligned articles.

17. A boxing system as set forth in claim 16 wherein said inlet port is rectangular.

18. A boxing system as set forth in claim 12 further comprising a movable pushing device for pushing said aligned articles from a position held by said holding members through the funnel-shaped guide and into said box.

* * * * *